United States Patent
deFreese et al.

(10) Patent No.: US 12,517,501 B2
(45) Date of Patent: Jan. 6, 2026

(54) PLY TEMPLATING FOR COMPOSITE FABRICATION WITH AI QUALITY CONTROL MODULES

(71) Applicant: Royal Engineered Composites, Inc., Minden, NE (US)

(72) Inventors: Matthew J. deFreese, Holdrege, NE (US); Judah Crowe, Kearney, NE (US); John Loucks, Sauble Beach (CA)

(73) Assignee: Royal Engineered Composites, Inc., Minden, NE (US)

( * ) Notice: Subject to any disclaimer, the term of this patent is extended or adjusted under 35 U.S.C. 154(b) by 369 days.

(21) Appl. No.: 17/963,905

(22) Filed: Oct. 11, 2022

(65) Prior Publication Data

US 2023/0115037 A1 Apr. 13, 2023

Related U.S. Application Data

(60) Provisional application No. 63/254,641, filed on Oct. 12, 2021.

(51) Int. Cl.
*G05B 19/418* (2006.01)

(52) U.S. Cl.
CPC ... *G05B 19/41875* (2013.01); *G05B 19/4183* (2013.01); *G05B 19/41885* (2013.01); *G05B 2219/32368* (2013.01)

(58) Field of Classification Search
CPC .......... G05B 19/41875; G05B 19/4183; G05B 19/41885; G05B 2219/32368; G05B 2219/32193
See application file for complete search history.

(56) References Cited

U.S. PATENT DOCUMENTS

| 5,153,839 | A | 10/1992 | Cross |
| 5,353,356 | A | 10/1994 | Waugh et al. |

(Continued)

FOREIGN PATENT DOCUMENTS

| CN | 1728173 A | 2/2006 |
| CN | 110678740 A | 1/2020 |

(Continued)

OTHER PUBLICATIONS

Sacco, C.(2019). Machine Learning Methods for Rapid Inspection of Automated Fiber Placement Manufactured Composite Structures. (Master's thesis).

(Continued)

*Primary Examiner* — Santosh R Poudel
(74) *Attorney, Agent, or Firm* — Suiter Swantz IP

(57) ABSTRACT

A quality control system may include a controller configured to be communicatively coupled with a monitoring assembly including one or more detectors. The controller may implement two or more AI quality control (AIQC) modules associated with two or more process steps for fabricating a composite material, where each of the two or more AIQC modules is associated with a different one of the two or more process steps. A particular AIQC module may receive monitoring data associated with the particular process step for a workpiece, generate quality control data using a particular AI model, and update the particular AI model based on testing data associated with the workpiece from one or more testing tools after at least the particular process step.

31 Claims, 10 Drawing Sheets

(56) References Cited

U.S. PATENT DOCUMENTS

| | | |
|---|---|---|
| 5,646,859 A | 7/1997 | Petta et al. |
| 6,036,319 A | 3/2000 | Rueb et al. |
| 6,170,163 B1 | 1/2001 | Bordignon et al. |
| 6,381,509 B1 | 4/2002 | Thiel et al. |
| 6,871,684 B2 | 3/2005 | Engelbart et al. |
| 7,443,282 B2 | 10/2008 | Tu et al. |
| 7,835,567 B2 | 11/2010 | Oldani |
| 7,969,306 B2 | 6/2011 | Ebert et al. |
| 8,069,071 B2 | 11/2011 | Kall et al. |
| 8,184,281 B2 | 5/2012 | Engelbart et al. |
| 8,468,670 B2 | 6/2013 | Baigorri |
| 8,965,539 B2 | 2/2015 | Hayes et al. |
| 9,037,282 B2 | 5/2015 | Reid et al. |
| 9,102,083 B2 | 8/2015 | David et al. |
| 9,187,188 B2 | 11/2015 | Richter et al. |
| 9,205,933 B2 | 12/2015 | Oberoi et al. |
| 9,233,469 B2 | 1/2016 | Lee et al. |
| 9,440,376 B2 | 9/2016 | Mao et al. |
| 9,591,273 B1 | 3/2017 | Wu et al. |
| 9,842,303 B2 | 12/2017 | Remtulla et al. |
| 9,873,230 B1 | 1/2018 | DesJardien et al. |
| 10,213,943 B2 | 2/2019 | Akasaki et al. |
| 10,262,232 B2 | 4/2019 | Klimovski et al. |
| 10,466,041 B2 | 11/2019 | Joachim |
| 10,500,721 B2 | 12/2019 | Takamizawa |
| 10,737,446 B2 | 8/2020 | Marcoe et al. |
| 10,755,401 B2 | 8/2020 | Bian et al. |
| 10,794,834 B2 | 10/2020 | Monchalin et al. |
| 11,158,041 B2 | 10/2021 | Ota et al. |
| 2006/0191622 A1 | 8/2006 | Ritter et al. |
| 2007/0115354 A1* | 5/2007 | Ohtomo .............. G01C 11/02 348/139 |
| 2009/0199948 A1 | 8/2009 | Kisch et al. |
| 2010/0063610 A1 | 3/2010 | Angell et al. |
| 2011/0089591 A1 | 4/2011 | Gordon et al. |
| 2011/0114247 A1 | 5/2011 | Lee et al. |
| 2014/0110875 A1 | 4/2014 | Khan |
| 2015/0253766 A1 | 9/2015 | Pettersson et al. |
| 2016/0339652 A1* | 11/2016 | Safai .................. G05B 19/048 |
| 2016/0343125 A1* | 11/2016 | Keitler ................ H04N 9/3185 |
| 2017/0100894 A1 | 4/2017 | Burns et al. |
| 2017/0248406 A1* | 8/2017 | Shadmehri .......... G01B 11/25 |
| 2017/0350764 A1 | 12/2017 | Thompson et al. |
| 2018/0046139 A1 | 2/2018 | Stahl et al. |
| 2018/0067464 A1 | 3/2018 | Budge et al. |
| 2018/0311914 A1 | 11/2018 | Marcoe et al. |
| 2018/0319046 A1 | 11/2018 | Johnson et al. |
| 2019/0143565 A1 | 5/2019 | Mohanty et al. |
| 2019/0180152 A1 | 6/2019 | Krompaß et al. |
| 2019/0266261 A1 | 8/2019 | Vinnik et al. |
| 2019/0310204 A1 | 10/2019 | Rueb |
| 2019/0318444 A1 | 10/2019 | Juarez et al. |
| 2019/0366574 A1 | 12/2019 | Bosworth et al. |
| 2019/0375171 A1 | 12/2019 | Choi et al. |
| 2019/0389681 A1 | 12/2019 | Miller, II |
| 2020/0005422 A1 | 1/2020 | Subramanian et al. |
| 2020/0047414 A1 | 2/2020 | Kothari et al. |
| 2020/0070370 A1 | 3/2020 | Wakabayashi |
| 2020/0117271 A1 | 4/2020 | Bosworth et al. |
| 2020/0125846 A1 | 4/2020 | Laughlin et al. |
| 2020/0160497 A1 | 5/2020 | Shah et al. |
| 2020/0166909 A1 | 5/2020 | Noone et al. |
| 2020/0226770 A1* | 7/2020 | Rueb .................... H04N 9/3194 |
| 2020/0250893 A1 | 8/2020 | Bernardon et al. |
| 2020/0262051 A1 | 8/2020 | Rueb |
| 2020/0293019 A1 | 9/2020 | Putman et al. |
| 2020/0327651 A1 | 10/2020 | Srivastava et al. |
| 2020/0387824 A1 | 12/2020 | Kelsey et al. |
| 2020/0402222 A1 | 12/2020 | Shah et al. |
| 2021/0042570 A1 | 2/2021 | Iskandar et al. |
| 2021/0254970 A1* | 8/2021 | Isabelle ................ G02B 7/08 |
| 2022/0121170 A1 | 4/2022 | Fornander et al. |
| 2022/0175454 A1* | 6/2022 | Chen ...................... A61B 90/36 |
| 2022/0207684 A1 | 6/2022 | Sugino et al. |
| 2022/0388017 A1* | 12/2022 | Itoh .................. G01N 35/00871 |
| 2023/0150056 A1* | 5/2023 | Zheng ................ B23K 26/046 219/121.85 |

FOREIGN PATENT DOCUMENTS

| | | |
|---|---|---|
| DE | 102019116750 A1 | 12/2020 |
| EP | 0229159 B1 | 4/1991 |
| EP | 3605453 A1 | 2/2020 |
| IN | 201917026430 A | 11/2019 |
| KR | 101035791 B1 | 5/2011 |
| TW | I384340 B * | 2/2013 |
| WO | 2020039104 | 2/2020 |
| WO | 2020228932 A1 | 11/2020 |

OTHER PUBLICATIONS

Sacco, et al., Machine learning in composites manufacturing: A case study of Automated Fiber Placement inspection, Composite Structures, vol. 250, 2020, ISSN 0263-8223, https://doi.org/10.1016/j.compstruct.2020.112514.

* cited by examiner

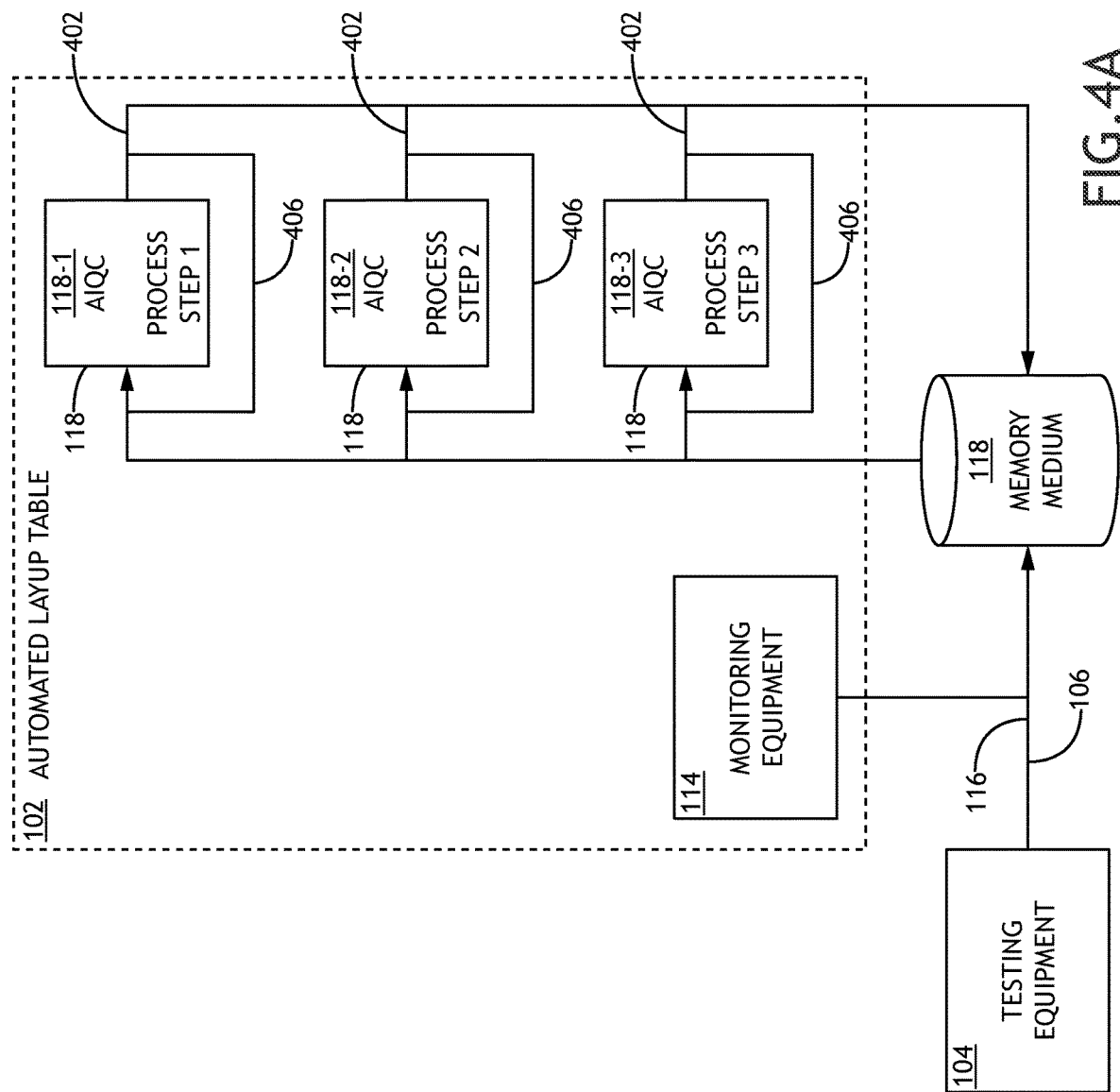

PLY TEMPLATING FOR COMPOSITE FABRICATION WITH AI QUALITY CONTROL MODULES

CROSS-REFERENCE TO RELATED APPLICATION

The present application claims the benefit under 35 U.S.C. § 119(e) of U.S. Provisional Application Ser. No. 63/254,641, filed Oct. 12, 2021, entitled SYSTEMS AND METHODS FOR COMPOSITE FABRICATION WITH AI QUALITY CONTROL MODULES, naming Matthew J. deFreese, Judah Crovve, and John Loucks as inventors, which is incorporated herein by reference in the entirety.

TECHNICAL FIELD

The present disclosure relates generally to composite manufacturing and, more particularly, to composite manufacturing guided by artificial intelligence (AI) quality control.

BACKGROUND

Composite materials may be formed through the sequential layup and subsequent curing of two or more layers. The composite material may further be formed into desired shapes and patterns by placing the materials on a mold prior to curing. The integrity and reliability of such a composite material depends not only on the particular materials used to form the composite, but also on the fabrication process. However, existing techniques for monitoring and/or refining the fabrication of composite materials have failure rates that are higher than desired. There is therefore a need to develop systems and methods to cure the above deficiencies.

SUMMARY

A quality control system is disclosed in accordance with one or more illustrative embodiments of the present disclosure. In some embodiments, the system comprise a controller configured to be communicatively coupled with a monitoring assembly including one or more detectors, wherein the controller includes one or more processors configured to execute program instructions causing the one or more processors to implement two or more artificial intelligence quality control (AIQC) modules associated with two or more process steps of a plurality of process steps for fabricating a composite material from two or more plies, wherein each of the two or more AIQC modules is associated with a different one of the two or more process steps, wherein a particular one of the one or more AIQC modules associated with a particular process step of the two or more process steps is configured to receive monitoring data from the monitoring assembly associated with the particular process step for a workpiece, the workpiece including at least one of a mold or any of the two or more plies, wherein the monitoring data includes at least one of data associated with the workpiece or a corresponding one of the one or more operators associated with the particular processing step. In some embodiments, the particular one of the one or more AIQC modules generates quality control data for the particular process step using a particular AI model based on input data including at least the monitoring data associated with the particular process step, the quality control data including at least a pass indicator or a fail indicator for the particular process step, wherein the particular AI model is trained on a training dataset including at least monitoring data for the particular process step associated with additional workpieces labeled with the pass indicator and the fail indicator. In some embodiments, the particular one of the one or more AIQC modules may further update the particular AI model based on testing data associated with the workpiece from one or more testing tools after at least the particular process step.

In some embodiments, the particular one of the one or more AIQC modules may further at least one of train or update the particular AI model with monitoring data and associated testing data from one or more additional process steps of the plurality of process steps.

In some embodiments, at least one of the one or more operators comprises a human operator. The locations of quality issues may be displayed on a human-machine interface. In some embodiments, the particular one of the one or more AIQC modules may further provide one or more quality control outputs associated with the quality control data for the particular process step to the corresponding operator for verification, the one or more quality control outputs including at least the pass indicator or the fail indicator, and receive a response from the corresponding operator including one of a verification or an override of the one or more quality control outputs. In some embodiments, the particular one of the one or more AIQC modules may further update the particular AI model based on the response from the operator and the associated monitoring data.

In some embodiments, at least one of updating the particular AI model based on the response from the operator and the associated monitoring data or updating the particular AI model based on testing data associated with the workpiece from one or more testing tools after at least the particular process step may be performed conditionally upon verification by a human user.

In some embodiments, completion of the particular process step requires one of: the pass indicator by the particular AI model and the verification by the operator or the fail indicator by the particular AI model and the override by the operator.

In some embodiments, at least one of the one or more operators comprises a robotic operator.

In some embodiments, the two or more process steps associated with the two or more AIQC modules include at least two of mold inspection, ply backing removal, foreign object detection, ply backing inspection, ply templating, ply orientation inspection, ply shaping, or de-bulk leak detection.

In some embodiments, at least one of the two or more AIQC modules may be associated with the process step of ply backing removal, wherein the corresponding quality control data includes a presence of at least a portion of a ply backing on the workpiece.

In some embodiments, the one or more quality control outputs include an indication of a location of the at least a portion of the ply backing on the workpiece.

In some embodiments, at least one of the two or more AIQC modules are associated with the process step of foreign object detection, wherein the corresponding quality control data includes a presence of one or more foreign objects, the one or more foreign objects including at least one of materials or objects that deviate from a recipe describing the workpiece. In some embodiments, the one or more quality control outputs include an indication of locations of the one or more foreign objects. In some embodiments, the one or more foreign objects include at least one of dust, hair, or a portion of a ply backing material. In some embodiments, the corresponding metrology data include hyperspectral image data with one or more images of the workpiece using one or more selected wavelengths. In some embodiments, the corresponding metrology data include spectroscopic data. In some embodiments, the particular AI model for the foreign object detection AIQC module may identify foreign objects on the workpiece using at least one of object detection, object classification, or a surface profile of the workpiece.

In some embodiments, at least one of the two or more AIQC modules are associated with the process step of ply orientation, wherein the corresponding quality control data includes an orientation of a weave pattern of a ply on the workpiece.

In some embodiments, at least one of the two or more AIQC modules are associated with the process step of ply conformance, wherein the corresponding quality control data includes a presence of one or more non-conformances of a ply on the workpiece. In some embodiments, at least one of the one or more non-conformances comprise at least one of a wrinkle or a bridge in the ply on the workpiece. In some embodiments, the one or more quality control outputs include an indication of locations of the one or more non-conformances. In some embodiments, the corresponding metrology data may include one or more images of the workpiece generated by infrared illumination, wherein the monitoring data includes flash thermography data.

In some embodiments, at least one of the two or more AIQC modules are associated with a de-bulk lead detection process step, wherein the corresponding quality control data includes a presence of a leak in a bag containing the workpiece.

In some embodiments, at least one of the two or more AIQC modules may be associated with a mold inspection process step. In some embodiments, the one or more quality control outputs include an indication of a presence or quality of a release agent. In some embodiments, the one or more quality control outputs include a surface quality of the mold. In some embodiments, the corresponding metrology data may include hyperspectral image data with one or more images of the workpiece using one or more selected wavelengths. In some embodiments, the corresponding metrology data may include spectroscopic data.

In some embodiments, at least one of the one or more quality control outputs for at least one of the one or more AIQC modules comprises operator-specific instructions for the corresponding operator of the particular process step based on the quality control data for the particular process step for one or more previous workpieces associated with the operator.

In some embodiments, at least one of the one or more quality control outputs for at least one of the one or more AIQC modules comprises locations of quality issues identified based on the quality control data on the workpiece.

In some embodiments, the locations of quality issues are provided as patterns projected onto the workpiece.

In some embodiments, at least one of the one or more testing tools comprises an ultrasonic testing tool.

In some embodiments, the particular one of the one more AIQC modules is configured to modify at least one of the one or more process steps of the composite fabrication process based on at least one of the monitoring data, the quality control data, or the testing data.

A quality control method is disclosed in accordance with one or more illustrative embodiments of the present disclosure. In some embodiments, the method includes fabricating a composite material from two or more plies using a plurality of process steps by one or more operators. In some embodiments, the method includes implementing two or more artificial intelligence quality control modules for two or more of the plurality of process steps.

In some embodiments, a particular one of the two or more AIQC modules is configured for receiving monitoring data from the monitoring assembly associated with the particular process step for a workpiece, the workpiece including at least one of a mold or any of the two or more plies, wherein the monitoring data includes at least one of data associated with the workpiece or a corresponding one of the one or more operators associated with the particular processing step. In some embodiments, the particular one of the two or more AIQC modules is configured for generating quality control data for the particular process step using a particular AI model based on input data including at least the monitoring data associated with the particular process step, the quality control data including at least a pass indicator or a fail indicator for the particular process step, wherein the particular AI model is trained on a training dataset including at least monitoring data for the particular process step associated with additional workpieces labeled with the pass indicator and the fail indicator. In some embodiments, the particular one of the two or more AIQC modules is configured for providing one or more quality control outputs associated with the quality control data for the particular process step to the corresponding operator for verification, the one or more quality control outputs including at least the pass indicator or the fail indicator. In some embodiments, the particular one of the two or more AIQC modules is configured for receiving a response from the corresponding operator including one of a verification or an override of the one or more quality control outputs. In some embodiments, the particular one of the two or more AIQC modules is configured for updating the particular AI model based on the response from the operator and the associated monitoring data. A particular one of the two or more AIQC modules may be configured for updating the particular AI model based on testing data associated with the workpiece from one or more testing tools after at least the particular process step.

In some embodiments, the two or more process steps associated with the two or more AIQC modules comprise at least two of mold inspection, ply backing removal, foreign object detection, ply backing inspection, ply templating, ply orientation inspection, ply shaping, or de-bulk leak detection.

In some embodiments, method further comprises modifying at least one of the one or more process steps of the composite fabrication process based on at least one of the monitoring data, the quality control data, or the testing data.

A composite fabrication system is disclosed in accordance with one or more illustrative embodiments of the present disclosure. In some embodiments, the system comprises a layup table. In some embodiments, the layup table comprise a workspace for receiving a workpiece for the fabrication of a composite material from two or more plies, wherein the composite material is fabricated by a plurality of process steps, wherein the workpiece includes at least one of the mold or any of the two or more plies at any of the plurality of process steps. In some embodiments, the layup table comprises a monitoring assembly including one or more detectors.

In some embodiments, the system comprises a controller communicatively coupled to the layup table, wherein the controller includes one or more processors configured to execute program instructions causing the one or more processors to implement two or more AI quality control (AIQC) modules associated with two or more process steps of the plurality of process steps, wherein each of the two or more AIQC modules is associated with a different one of the two or more process steps. In some embodiments, a particular one of the two or more AIQC modules associated with a particular process step of the plurality of process steps is configured to receive monitoring data from the monitoring assembly associated with the particular process step for the workpiece, wherein the monitoring data includes at least one of data associated with the workpiece or a corresponding one of the one or more operators associated with the particular processing step. In some embodiments, the particular one of the two or more AIQC modules associated with a particular process step of the plurality of process steps is configured to generate quality control data for the particular process step using a particular AI model based on input data including at least the monitoring data associated with the particular process step, the quality control data including at least a pass indicator or a fail indicator for the particular process step, wherein the particular AI model is trained on a training dataset including at least monitoring data for the particular process step associated with additional workpieces labeled with the pass indicator and the fail indicator. In some embodiments, the particular one of the two or more AIQC modules associated with a particular process step of the plurality of process steps is configured to update the particular AI model based on testing data associated with the workpiece from one or more testing tools after at least the particular process step.

In some embodiments, a particular one of the two or more AIQC modules associated with a particular process step of the plurality of process steps may further at least one of train or update the particular AI model with monitoring data and associated testing data from one or more additional process steps of the plurality of process steps.

In some embodiments, at least one of the one or more operators comprises a human operator.

In some embodiments, the particular one of the two or more AIQC modules associated with a particular process step of the plurality of process steps is configured to provide one or more quality control outputs associated with the quality control data for the particular process step to the corresponding operator for verification, the one or more quality control outputs including at least the pass indicator or the fail indicator, and receive a response from the corresponding operator including one of a verification or an override of the one or more quality control outputs.

In some embodiments, the particular one of the two or more AIQC modules associated with a particular process step of the plurality of process steps is configured to update the particular AI model based on the response from the operator and the associated monitoring data. In some embodiments, at least one of updating the particular AI model based on the response from the operator and the associated monitoring data or updating the particular AI model based on testing data associated with the workpiece from one or more testing tools after at least the particular process step is performed conditionally upon verification by a human user.

In some embodiments, completion of the particular process step requires one of: the pass indicator by the particular AI model and the verification by the operator, or the fail indicator by the particular AI model and the override by the operator.

In some embodiments, at least one of the one or more operators comprises a robotic operator.

In some embodiments, the two or more process steps associated with the two or more AIQC modules comprise at least two of mold inspection, ply backing removal, foreign object detection, ply templating, ply orientation inspection, ply conformance, or de-bulk leak detection.

In some embodiments, at least one of the one or more quality control outputs for at least one of the one or more AIQC modules comprises operator-specific instructions for the corresponding operator of the particular process step based on the quality control data for the particular process step for one or more previous workpieces associated with the operator.

In some embodiments, at least one of the one or more quality control outputs for at least one of the one or more AIQC modules comprises locations of quality issues identified based on the quality control data on the workpiece. In some embodiments, the locations of quality issues are provided as patterns projected onto the workpiece. In some embodiments, the locations of quality issues are displayed on a human-machine interface.

In some embodiments, the workspace includes a platform for receiving the workpiece. In some embodiments, at least one of a height or a rotation angle of the platform is adjustable. In some embodiments, the layup table is mounted on wheels. In some embodiments, a size of the layup table is adjustable to fit within a door of a selected size.

In some embodiments, at least one of the one or more testing tools comprises an ultrasonic testing tool.

In some embodiments, the monitoring assembly of a particular one of the one or more automated layup tables comprises one or more illumination sources, wherein the one or more detectors include one or more imaging detectors to generate one or more images of the workpiece when illuminated by the one or more illumination sources.

In some embodiments, the one or more imaging detectors provide at least a portion of the monitoring data associated with at least two of the two or more process steps associated with AIQC modules, the at least two of the two or more process steps including at least two of at least two of ply backing removal, foreign object detection, ply templating, or ply orientation inspection.

In some embodiments, the monitoring assembly comprises one or more thermal sources and one or more infrared detectors to generate one or more images of the workpiece when heated by the one or more thermal sources.

In some embodiments, the one or more imaging detectors provide at least a portion of the monitoring data associated with at least two of the two or more process steps associated with AIQC modules, the at least two of the two or more process steps including at least two of at least two of ply conformance or de-bulk leak detection.

In some embodiments, the particular one of the two or more AIQC modules is configured to modify at least one of the one or more process steps of the composite fabrication process based on the quality control data.

A composite fabrication system is disclosed in accordance with one or more illustrative embodiments of the present disclosure. In some embodiments, the system includes two or more layup tables. In some embodiments, each of the one or more layup tables comprises a workspace for receiving a workpiece for the fabrication of a composite material from two or more plies, wherein the composite material is fabricated by a plurality of process steps, wherein the workpiece includes at least one of the mold or any of the two or more plies at any of the plurality of process steps. In some embodiments, each of the one or more layup tables comprises a monitoring assembly including one or more detectors. In some embodiments, each of the one or more layup tables comprises a controller communicatively coupled to the layup table, wherein the controller includes one or more processors configured to execute program instructions causing the one or more processors to implement two or more AI quality control (AIQC) modules associated with two or more process steps of the plurality of process steps, wherein each of the two or more AIQC modules is associated with a different one of the two or more process steps. In some embodiments, a particular one of the two or more AIQC modules associated with a particular process step of the plurality of process steps is configured to receive monitoring data from the monitoring assembly associated with the particular process step for the workpiece, wherein the monitoring data includes at least one of data associated with the workpiece or a corresponding one of the one or more operators associated with the particular processing step. In some embodiments, the particular one of the two or more AIQC modules associated with a particular process step of the plurality of process steps is configured to generate quality control data for the particular process step using a particular AI model based on input data including at least the monitoring data associated with the particular process step, the quality control data including at least a pass indicator or a fail indicator for the particular process step, wherein the particular AI model is trained on a training dataset including at least monitoring data for the particular process step associated with additional workpieces labeled with the pass indicator and the fail indicator. In some embodiments, the particular one of the two or more AIQC modules associated with a particular process step of the plurality of process steps is configured to update the particular AI model based on testing data associated with the workpiece from one or more testing tools after at least the particular process step.

In some embodiments, the plurality of processing steps for fabricating a composite material associated with the workpiece are distributed between the two or more layup tables.

In some embodiments, the plurality of processing steps are performed separately on the two or more layup tables to fabricate two or more of the composite materials associated with two or more of the workpieces in parallel.

In some embodiments, at least one of the one or more operators comprises a human operator.

In some embodiments, the particular one of the two or more AIQC modules associated with a particular process step of the plurality of process steps is configured to provide one or more quality control outputs associated with the quality control data for the particular process step to the corresponding operator for verification, the one or more quality control outputs including at least the pass indicator or the fail indicator, and receive a response from the corresponding operator including one of a verification or an override of the one or more quality control outputs.

In some embodiments, the particular one of the two or more AIQC modules associated with a particular process step of the plurality of process steps is configured to update the particular AI model based on the response from the operator and the associated monitoring data.

In some embodiments, at least one of updating the particular AI model based on the response from the operator and the associated monitoring data or updating the particular AI model based on testing data associated with the workpiece from one or more testing tools after at least the particular process step is performed conditionally upon verification by a human user.

In some embodiments, completion of the particular process step requires one of: the pass indicator by the particular AI model and the verification by the operator, or the fail indicator by the particular AI model and the override by the operator.

In some embodiments, at least one of the one or more operators comprises a robotic operator.

A ply templating system is disclosed in accordance with one or more illustrative embodiments of the present disclosure. In some embodiments, the system includes one or more optical elements configured to project one or more placement patterns onto a workpiece. In some embodiments, the system includes a monitoring assembly includes one or more detectors. In some embodiments, the system includes a controller communicatively coupled with the monitoring assembly. In some embodiments, the controller receives a map of a workpiece and a desired placement position of a ply on the workpiece. In some embodiments, the controller receives image data from the monitoring assembly associated with the workpiece. In some embodiments, the controller implements one or more AI models to identify the workpiece in the image data and further identify the desired placement position of the ply on the workpiece. In some embodiments, the controller directs the one or more optical elements to project a placement pattern on the workpiece at the desired placement position. In some embodiments, the controller detects movements of the workpiece in the image data. In some embodiments, the controller directs the one or more optical elements to update the placement pattern on the workpiece based on the movements of the workpiece.

In some embodiments, the one or more optical elements comprise an optical projector. In some embodiments, the one or more optical elements comprise a scanner.

In some embodiments, implementing the one or more AI models to identify the workpiece in the image data and further identify the desired placement position of the ply on the workpiece comprises determining one or more tracking points on at least one of the workpiece or the ply, and tracking locations of the one or more tracking points.

In some embodiments, the system further comprises a platform for securing the workpiece. In some embodiments, implementing the one or more AI models to identify the workpiece in the image data and further identify the desired placement position of the ply on the workpiece further comprises determining one or more additional tracking points on the platform, tracking locations of the one or more additional tracking points, and identifying movements of the workpiece relative to the platform. In some embodiments, the platform is at least partially transparent, wherein the ply templating system further comprises an illumination source to illuminate the workpiece through the at least partially transparent platform. In some embodiments, at least a portion of the platform is rotatable.

In some embodiments, the image data comprises two-dimensional image data. In some embodiments, the monitoring assembly includes an imaging detector to generate the two-dimensional image data. In some embodiments, the AI model identifies the workpiece in the image data and the desired placement position of the ply using two-dimensional object detection.

In some embodiments, the image data comprises three-dimensional image data. In some embodiments, the monitoring assembly includes two spatially-separated imaging detectors to generate the three-dimensional image data. In some embodiments, the AI model identifies the workpiece in the image data and the desired placement position of the ply using three-dimensional object detection. In some embodiments, the monitoring assembly includes one or more depth sensors to generate the three-dimensional image data.

In some embodiments, an orientation of the workpiece is known prior to generating the image data. In some embodiments, an orientation of the workpiece is unknown prior to generating the image data, wherein the AI model further determines the orientation of the workpiece.

A system is disclosed, in accordance with one or more illustrative embodiments of the present disclosure. In some embodiments, the system includes a controller communicatively coupled with a monitoring assembly including one or more detectors and to one or more optical elements configured to project one or more placement patterns onto a workpiece. In some embodiments, the system receives a map of a workpiece and a desired placement position of a ply on the workpiece. In some embodiments, the system receives image data from the monitoring assembly associated with the workpiece. In some embodiments, the system implements one or more AI models to identify the workpiece in the image data and further identify the desired placement position of the ply on the workpiece. In some embodiments, the system directs the one or more optical elements to project a placement pattern on the workpiece at the desired placement position. In some embodiments, the system detects movements of the workpiece in the image data. In some embodiments, the system direct the one or more optical elements to update the placement pattern on the workpiece based on the movements of the workpiece.

A ply templating method is disclosed in accordance with one or more illustrative embodiments of the present disclosure. In some embodiments, the method includes receiving a map of a workpiece and a desired placement position of a ply on a workpiece. In some embodiments, the method includes receiving image data associated with the workpiece from a monitoring assembly including one or more detectors. In some embodiments, the method includes implementing one or more AI models to identify the workpiece in the image data and further identify the desired placement position of the ply on the workpiece. In some embodiments, the method includes directing the scanner to project a placement pattern on the workpiece at the desired placement position. In some embodiments, the method includes detecting movements of the workpiece in the image data. In some embodiments, the method includes directing the scanner to update the placement pattern on the workpiece based on the movements of the workpiece.

In some embodiments, the one or more optical elements comprise an optical projector. In some embodiments, the one or more optical elements comprise a scanner.

In some embodiments, implementing the one or more AI models to identify the workpiece in the image data and further identify the desired placement position of the ply on the workpiece comprises determining one or more tracking points on at least one of the workpiece or the ply, and tracking locations of the one or more tracking points.

In some embodiments, implementing the one or more AI models to identify the workpiece in the image data and further identify the desired placement position of the ply on the workpiece further comprises determining one or more additional tracking points on a platform securing the workpiece, tracking locations of the one or more additional tracking points, and identifying movements of the workpiece relative to the platform.

In some embodiments, the platform is at least partially transparent, wherein the ply templating system further comprises: an illumination source to illuminate the workpiece through the at least partially transparent platform. In some embodiments, at least a portion of the platform is rotatable.

In some embodiments, the image data comprises two-dimensional image data. In some embodiments, the monitoring assembly includes an imaging detector to generate the two-dimensional image data. In some embodiments, the AI model identifies the workpiece in the image data and the desired placement position of the ply using two-dimensional object detection.

In some embodiments, the image data comprises three-dimensional image data. In some embodiments, the monitoring assembly includes two spatially-separated imaging detectors to generate the three-dimensional image data. In some embodiments, the AI model identifies the workpiece in the image data and the desired placement position of the ply using three-dimensional object detection. In some embodiments, the monitoring assembly includes one or more depth sensors to generate the three-dimensional image data. In some embodiments, an orientation of the workpiece is known prior to generating the image data. In some embodiments, an orientation of the workpiece is unknown prior to generating the image data, wherein the method further determines the orientation of the workpiece.

A composite mold inspection system is disclosed in accordance with one or more illustrative embodiments of the present disclosure. In some embodiments, the system includes a monitoring assembly including one or more detectors. In some embodiments, the system includes a controller communicatively coupled with the monitoring assembly. In some embodiments, the controller receives images from the monitoring assembly associated with a set of molds with known values of one or more quality issues. In some embodiments, the controller trains an AI model with training data including the images associated with the set of molds and the known values of the one or more quality issues. In some embodiments, the controller receives image data from the monitoring assembly associated with a run-time mold with unknown values of the one or more quality issues. In some embodiments, the controller implements the AI model with the image data associated with the run-time mold as input data, wherein the AI model generates quality control data indicative of a quality of the run-time mold. In some embodiments, the controller provides one or more quality control outputs based on the quality control data for at least one of feedback or feedforward control of a composite fabrication process.

In some embodiments, the controller further modifies one or more process steps of the composite fabrication process based on the quality control data.

In some embodiments, the one or more quality issues include at least one of a presence or distribution of a release agent. In some embodiments, the one or more quality issues include deterioration of the mold. In some embodiments, the one or more quality issues include a surface quality of the mold. In some embodiments, the deterioration of the mold includes aging-induced deterioration of the mold.

In some embodiments, the monitoring assembly further includes one or more narrowband illumination sources, wherein the monitoring assembly generates one or more narrowband images based on illumination with the one or more narrowband illumination sources.

In some embodiments, the monitoring assembly further includes a broadband illumination source and one or more narrowband spectral filters, wherein the monitoring assembly generates one or more images based on illumination with the broadband illumination source and the one or more narrowband spectral filters.

In some embodiments, the image data associated with at least one of the set of molds or the run-time mold comprises hyperspectral image data.

In some embodiments, the monitoring assembly includes a single imaging detector to generate two-dimensional data.

In some embodiments, the monitoring assembly includes two spatially-separated imaging detectors to generate three-dimensional data.

In some embodiments, at least one of the one or more quality control outputs comprises at least a portion of the images from the monitoring assembly associated with the run-time mold associated with locations of at least one of the one or more quality issues. In some embodiments, the at least a portion of the images includes mark-ups to identify the locations of at least one of the one or more quality issues.

A composite mold inspection system is disclosed in accordance with one or more illustrative embodiments of the present disclosure. In some embodiments, the system includes a controller communicatively coupled with a monitoring assembly including one or more detectors. In some embodiments, the controller receives images from the monitoring assembly associated with a set of molds with known values of one or more quality issues. In some embodiments, the controller train an AI model with training data including the images associated with the set of molds and the known values of the one or more quality issues. In some embodiments, the controller receives images from the monitoring assembly associated with a run-time mold with unknown values of the one or more quality issues. In some embodiments, the controller implements the AI model with the images associated with the run-time mold as input data, wherein the AI model generates quality control data indicative of a quality of the run-time mold. In some embodiments, the controller provides one or more quality control outputs based on the quality control data for at least one of feedback or feedforward control of a composite fabrication process.

In some embodiments, the controller modifies one or more process steps of the composite fabrication process based on the quality control data.

In some embodiments, the one or more quality issues include at least one of a presence or distribution of a release agent. In some embodiments, the one or more quality issues include deterioration of the mold. In some embodiments, the deterioration of the mold includes aging-induced deterioration of the mold. In some embodiments, the one or more quality issues include a surface quality of the mold.

In some embodiments, the monitoring assembly further includes one or more narrowband illumination sources, wherein the monitoring assembly generates one or more narrowband images based on illumination with the one or more narrowband illumination sources.

In some embodiments, the monitoring assembly further includes a broadband illumination source and one or more narrowband spectral filters, wherein the monitoring assembly generates one or more images based on illumination with the broadband illumination source and the one or more narrowband spectral filters.

In some embodiments, the image data associated with at least one of the set of molds or the run-time mold comprises hyperspectral image data.

In some embodiments, the monitoring assembly includes a single imaging detector to generate two-dimensional data. In some embodiments, the monitoring assembly includes two spatially-separated imaging detectors to generate three-dimensional data.

In some embodiments, at least one of the one or more quality control outputs comprises at least a portion of the images from the monitoring assembly associated with the run-time mold associated with locations of at least one of the one or more quality issues. In some embodiments, the at least a portion of the images includes mark-ups to identify the locations of at least one of the one or more quality issues.

A composite mold inspection method is disclosed in accordance with one or more illustrative embodiments of the present disclosure. In some embodiments, the method includes receiving images from a monitoring assembly including one or more detectors, the images associated with a set of molds with known values of one or more quality issues. In some embodiments, the method includes training an AI model with training data including the images associated with the set of molds and the known values of the one or more quality issues. In some embodiments, the method includes receiving images from the monitoring assembly associated with a run-time mold with unknown values of the one or more quality issues. In some embodiments, the method includes implementing the AI model with the images associated with the run-time mold as input data, wherein the AI model generates quality control data indicative of a quality of the run-time mold. In some embodiments, the method includes providing one or more quality control outputs based on the quality control data for at least one of feedback or feedforward control of a composite fabrication process.

BRIEF DESCRIPTION OF DRAWINGS

The numerous advantages of the disclosure may be better understood by those skilled in the art by reference to the accompanying figures.

FIG. 4A is a block-level flow diagram of an AI-guided composite fabrication system providing ply that implements multiple AIQC modules for AI-guided quality control of multiple process steps, in accordance with one or more embodiments of the present disclosure.

DETAILED DESCRIPTION

Figure 1:
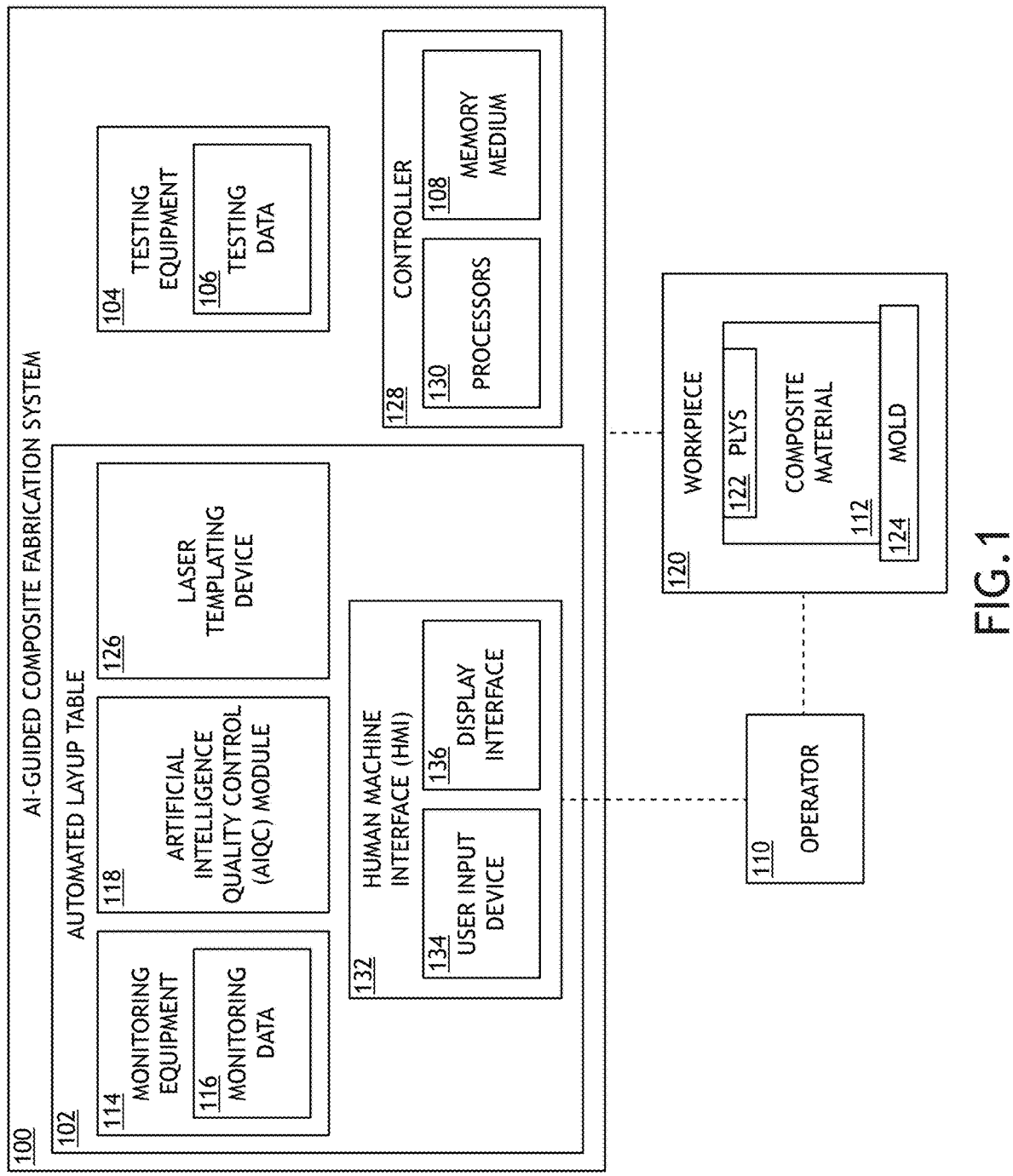
FIG. 1 is a block diagram view of an AI-guided composite fabrication system for use in composite material fabrication, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for composite manufacturing while implementing quality control analysis based on artificial intelligence (AI) or machine learning techniques at various processing steps.

A composite material may generally be formed by the sequential layup of multiple layers (e.g., plies) of the same or different compositions followed by a curing process such as, but not limited to, the application of heat, pressure, or light (e.g., ultraviolet light). As used herein, the terms ply and layer of a composite material are used interchangeably. For example, a composite material may be formed as a series of structural layers, where at least some of the structural layers are separated by resin layers. The resulting cured composite material may then have desired characteristics based on the combined properties of the constituent layers such as, but not limited to, desired mechanical, chemical, electrical, or optical properties.

In embodiments of the present disclosure, a composite material is fabricated by performing a sequence of process steps, where step-specific AI quality control (AIQC) modules assess the quality of a workpiece at various process steps, provide guidance and/or alerts when necessary, and provide pass or fail indicators when the various process steps have been completed (or at least attempted) based on selected quality metrics. In this way, sources of potential weakness in a composite material may be identified and corrected to the extent possible at each process step. More broadly, however, it is contemplated herein that AI-guided quality control is not limited to the detection of defects or nonconformities at any particular process step but may rather identify patterns or processes that tend to result in fabricated composite materials that meet or exceed quality metrics. In some embodiments, a pass indicator from an AIQC module is required for a process step to be successfully completed such that subsequent process steps may not occur until such a pass indicator is provided.

In a general sense, AI-guided quality control may be performed at any process step associated with the layup of any number of layers. For example, AI-guided quality control may be performed on a mold prior to the placement of any layers to inspect for quality issues such as, but not limited to, foreign objects, the presence of release agents, surface quality of the mold, or material aging of the mold. By way of another example, AI-guided quality control may be performed for any of multiple steps associated with the layup of a particular layer (e.g., a ply) such as, but not limited to, the removal of backing material from either side of a ply, laser templating to project outlines for placement of the ply, verification of the ply placement, or working of the ply. Further, such AI-guided quality control may be performed for the associated process steps on any number of successive layers forming the composite structure. By way of another example, AI-guided quality control may be performed for any de-bulking steps prior to or after material testing and/or curing.

It is contemplated herein that early detection of potential quality issues during fabrication may improve the quality of fabricated composite material and improve fabrication yield by reducing a number of defectively fabricated materials. For example, identification of a potential quality issue at a particular process step prior to any subsequent process steps may enable efficient actions to be taken such as, but not limited to, reworking the process step if possible or immediately scrapping the material if working is not possible. Again, such quality issues may refer to nonconformities and/or patterns that may lead to high-quality completed composite materials. Additionally, close monitoring of many process steps enables precise identification of the root cause of any such quality issues. In contrast, typical quality checks such as, but not limited to, pre- or post-cure quality checks may reduce the ability to take corrective actions or precisely determine the root causes and/or the associated process steps leading to the quality issue.

It is further contemplated herein that various factors may impact the quality of a composite material. For example, the integrity and/or reliability of a composite material may depend on nonconformities associated with any of the constituent materials such as, but not limited to, wrinkles or creases in a layer, voids between layers, the presence of foreign objects, or any other physical defect. As another example, the integrity and/or reliability of a composite material may depend on various aspects of a mold used to shape the constituent plies such as, but not limited to, a type of release agent present, an amount of the release agent on the mold, or a surface quality of the mold.

More broadly, however, it is contemplated herein that the integrity and/or reliability of a composite material may depend on the fabrication process. In particular, the integrity and/or reliability of a composite material may depend on subtle characteristics associated with any of the process steps or relationships between different process steps. For instance, a weakness in a completed composite material may be the result of a combination of factors from multiple process steps, even when each of the process steps satisfy traditional quality control checks. As a non-limiting illustration, it may be the case that the characteristics of a particular ply (e.g., a ply orientation) are typically acceptable, but may result in a weakness of a completed composite material when combined with a characteristic of a ply in another layer (e.g., stretching a ply in a particular location). As a result, a structural weakness may exist despite each process step being free of nonconformances or each process step complying with traditional quality control guidelines. As another non-limiting illustration, it may be the case that particular techniques for implementing a given process step may tend to result in statistically higher quality metrics for completed materials than alternative techniques, even if all of these techniques pass traditional quality control guidelines. For instance, the working of a ply into a mold may involve pressing the ply into contours of the mold, smoothing the ply, and the like. However, it may be the case that the different techniques for pressing and smoothing and/or a number of attempts needed to achieve a successful result may have subtle impacts on the resulting quality of the composite material. AI-guided process control using step-specific AI modules as disclosed herein may facilitate identification of such techniques and generate quality control data accordingly.

It is further contemplated herein that human operators may be inefficient and/or ineffective at assessing the quality of a composite material under fabrication at any particular process step or the relationships between different process steps. For example, physical defects or other quality issues (e.g., wrinkles, bridges, or the like) that are too small to be resolvable with the unaided eye may lead to weaknesses that render the completed composite material outside of tolerances and/or may be detectable during pre- or post-cure testing. Further, even with the assistance of various detectors, human operators may fail to identify the impact of a particular observed quality issue on the integrity or reliability of the final composite material alone or when combined with other quality issues on the same or different layers. Similarly, human operators may be inefficient and/or ineffective at assessing a particular remedial measure is sufficient to improve the integrity or reliability of the final composite structure. However, step-specific AI-based quality control as disclosed herein may provide real-time detection of quality issues at each process step that may be based not only on monitoring data from the associated process step but also on monitoring data from any previous process steps to identify compound issues (e.g., quality control issues related to patterns between process steps). Such quality issues may then be corrected prior to advancing to subsequent steps to the extent possible or practical.

Some embodiments are directed to an automated layup table providing AI-guided quality control during composite fabrication. In some embodiments, an AI-guided composite fabrication system includes a layup table with a platform suitable for the fabrication of a composite material, a monitoring assembly including illumination sources and detectors for generating monitoring data on a workpiece associated with the composite material, and a controller implementing one or more step-specific AI quality control (AIQC) modules for assessing the quality of a particular process step. For the purposes of the present disclosure, the term workpiece is used to describe any portion of the composite material at any process step (e.g., one or more plies) and/or associated accessories such as, but not limited to, a mold for shaping the composite material or tools used at any process step.

In some embodiments, AI-guided quality control is performed using a series of step-specific AI quality control (AIQC) modules tailored for particular process steps. Each AIQC module may utilize AI or machine learning techniques to assess a quality or other characteristic of a workpiece at a particular process step. As used herein, the terms AI and machine learning techniques are used interchangeably. For example, a particular AIQC module may receive monitoring data (e.g., from a monitoring system including one or more detectors and optionally one or more illumination sources) generated as an operator performs actions associated with a particular process step. The AIQC module may then analyze this monitoring data and generate one or more quality control outputs associated with the quality of the workpiece and/or the actions of the operator.

An AIQC module may provide a variety of quality control outputs. For example, a quality control output may include a pass/fail indicator upon completion of a process step. In this way, an operator may proceed to a subsequent step if a pass indication is provided and take other actions if a failure indication is provided. As another example, a quality control output may include an indication (e.g., on a display screen or on the workpiece directly using a projected laser or other indicator) of a particular quality issue such as, but not limited to, an incorrectly oriented ply, a foreign object, a wrinkle, or a void. As another example, a quality control output may include suggested guidance (e.g., in real time or after a failure indication) to the operator to ensure a desired workpiece quality. Such guidance may include, but is not limited to, identified techniques for performing the particular process step based on previous data. In some embodiments, the operator may verify or override the pass or fail indicator. In this way, the operator may have ultimate control over whether a particular step is successfully completed. Feedback based on such verification or override decisions may be used to further train or update the associated AI model.

Each step-specific AIQC module may be trained and/or updated from a wide range of data sources. It is contemplated herein that it may be valuable to train and utilize step-specific AIQC modules with data from multiple sources (e.g., with multiple feedback loops) in order to promote both robust operation and identification of impacts of any variations on the overall quality of a completed composite material.

For example, an AIQC module associated with a particular process step may be trained and/or updated with at least some data suitable for promoting robust operation generally without regard to any impacts on the quality of the completed composite material and also with at least some data suitable for relating the impact of any variations on the completed composite material. As an illustration for a process step of ply backing removal (or associated inspection), it may be the case that failure to fully remove ply backing or residual materials may not necessarily produce a catastrophic loss of integrity and/or reliability of the final composite material in all cases. For instance, a portion of backing material below a certain size may be acceptable in a given application. However, an associated AIQC module may be trained and/or updated with at least some data relating to both acceptable and non-acceptable cases. Such training may include monitoring data labeled based on the actual presence of such materials. In this way, the AIQC module may reliably identify the presence of ply backing and/or residual materials with a high sensitivity regardless of the impact of on the completed composite material.

In addition, the AIQC module may be further trained and/or updated with at least some data associated with the quality of the completed composite material. For instance, data from post-layup testing either pre- or post-cure (e.g., ultrasonic testing, or the like) related to the quality of the completed composite material (e.g., the integrity and/or reliability) may be used as labels related to whether the completed composite material passed or failed a quality check. Such training and/or updating may provide additional context such that the AIQC may be able to distinguish acceptable or unacceptable conditions for that specific process step. Continuing the illustration of ply backing removal, this technique may enable such a step-specific AIQC module to identify conditions in which identified ply backing and/or residual material negatively impacts the quality of the completed composite material and the resulting extent.

This methodology may be further extended to include training and/or updating an AIQC module for a specific process step with monitoring data associated with other process steps that occur either before or after the specific process step. In this way, the step-specific AIQC module may further identify patterns between monitoring data from the specific process step and monitoring data from the other process steps and the associated impacts of these patterns on the ultimate quality of the completed composite material. Continuing the illustration of ply backing removal, this technique may enable such a step-specific AIQC module to identify a pattern in which identified ply backing of a certain size and in a certain location results in failure only when (or substantially when) another condition is present (e.g., a foreign object in the same location on a different ply). It is to be understood that such examples are merely illustrative of the capabilities of the systems and methods disclosed herein and should not be interpreted as limiting.

It is contemplated herein that the systems and methods disclosed herein may provide numerous advantages over alternative techniques. For example, the performance of AI models are generally dependent on the quality and amount of training data used for training and/or updating. As a practical matter, the use of step-specific AIQC modules associated with multiple process steps in a fabrication process may be more efficient and robust than a global AI-based quality control scheme that simply incorporates monitoring data from all monitored process steps. For example, as described previously, multiple feedback loops for training of step-specific AI modules may facilitate both robust training of an AI model in a step-specific AIQC module to complete a particular task (e.g., foreign object detection, ply backing inspection, or the like) and training to contextualize the impact of any identified patterns on the ultimate quality of the completed material, alone or in combination with additional process steps.

In some embodiments, an AIQC module provides operator-specific guidance or operation. It is contemplated herein that any of the various process steps associated with fabrication of a composite material may be performed by a human operator, a robotic operator, or a combination of human and/or robotic operators. It is further contemplated herein that different operators may exhibit different patterns or techniques for implementing a particular process step and that these different patterns or techniques may impact the quality of the workpiece at the particular process step. For example, certain operators may have higher rates of inducing particular quality issues. As a result, an AIQC module may receive as an input an identifier of the operator performing the associated process step then and tailor or otherwise modify the quality control outputs based on the identified operator.

Additional embodiments of the present disclosure are directed to an automated composite fabrication system including a series of automated layup tables. In this way, multiple composite materials may be fabricated in parallel. In some embodiments, each automated layup table may have separate AIQC modules that are separately trained and operate independently of each other. However, all AIQC modules across all of the automated layup tables may receive testing data associated with completed or semi-completed composite materials, which may indicate compliance or non-compliance with one or more quality control standards. For example, quality control standards may be application-specific and/or material specific and may relate to reliability of the composite material. In some embodiments, the AIQC modules associated with common process steps across the different automated layup tables may be shared, synchronized, cloned, or otherwise linked such that they all operate in the same manner.

Additional embodiments of the present disclosure are directed to an AI-guided ply templating system for proper ply placement. It is recognized herein that existing technologies for templating typically rely on the use of alignment target structures on a table and/or a workpiece to determine the orientation and placement of a workpiece. Further, many existing systems provide multiplexed operation over multiple tables. However, existing systems typically suffer from low refresh rates and are relatively sensitive to vibrations or bumps to the tables. In some embodiments of the present disclosure, an AI-guided templating system captures image data of a workpiece, analyzes the image data with one or more AI models to generate tracking points for any combination of the workpiece, a ply, or a platform securing the workpiece. The system may then receive layup information including a desired placement of a ply on the workpiece and project one or more patterns onto the workpiece based on the layup information. Such a system may include any type of illumination source including, but not limited to, one or more lasers. It is contemplated herein that generating placement patterns based on tracking points generated by AI-guided image analysis may provide robust templating in the presence of physical movement of the workpiece such as, but not limited to, bumps or vibrations. In particular, the system may recognize the physical movements and update the projected patterns based on associated changes to the tracking points.

Additional embodiments of the present disclosure are directed to an AI-guided mold inspection system. It is recognized herein that the quality of a mold used to shape a composite material during fabrication may impact the quality of the composite material. For example, the presence of foreign objects such as dust or debris may deform one or more layers of the composite. By way of another example, nonuniformities or degradation of the release agent may weaken the effectiveness of the release agent and may result in undesired adhesion of layers to the mold, pitting in the surface of a cured laminate, and/or leaks during a subsequent de-bulking step. In some embodiments, an AI-guided mold inspection captures one or more images of a mold and analyzes the images with one or more AI models to determine the presence of defects on the mold. In some embodiments, an AI-guided mold inspection system captures images of the mold at one or more wavelengths and analyzes the image data with one or more AI models to determine a quality of the mold prior to the layup of any layers to form a composite material. The capture of images at multiple wavelengths may be implemented using any of a variety of techniques within the spirit and scope of the present disclosure. For example, the AI-guided mold inspection system may sequentially illuminate the mold with illumination having different wavelengths or wavelength bands and capture associated images of the mold. By way of another example, the AI-guided mold inspection system may illuminate the mold with broadband illumination and spectrally filter collected light to form separate images.

Referring now to FIGS. 1A-5B, systems and methods for AI-guided composite fabrication are described in greater detail in accordance with one or more embodiments of the present disclosure.

FIG. 1 is a block diagram view of an AI-guided composite fabrication system 100 for use in composite material fabrication, in accordance with one or more embodiments of the present disclosure.

In some embodiments, the AI-guided composite fabrication system 100 includes at least one automated layup table 102, testing equipment 104 for analyzing a composite material 112 at one or more selected stages of the fabrication process and generating associated testing data 106, and a memory medium 108 to store data associated with the composite material 112 from any number of automated layup tables 102 and/or the testing equipment 104. The automated layup table 102 may provide a workspace for an operator 110 to carry out various process steps for the fabrication of a composite material 112, include monitoring equipment 114 to generate monitoring data 116 associated with any of the process steps, and implement at least one AIQC module 118 to provide AI-based quality control for at least some of the process steps based on at least the monitoring data 116.

As an illustration, an operator 110 may perform various process steps on a workpiece 120 located on an automated layup table 102 as a part of a fabrication process of a composite material 112. The workpiece 120 may generally include one or more plies 122 (e.g., material layers) used to form the composite material 112 and may optionally include a mold 124 used to shape the plies 122. The operator 110 may generally be a human or a robot (e.g., a machine) and different operators 110 may perform different process steps using the automated layup table 102.

In some embodiments, the automated layup table 102 includes a dedicated templating device 126 for projecting an outline on the workpiece 120 indicating a desired location and/or orientation of a ply 122 to guide the placement of the ply 122 by the operator 110. The templating device 126 may include an illumination source including, but not limited to, a laser source. The templating device 126 may further include one or more optics to illuminate the workpiece 120 with a desired pattern using the illumination source. For example, the templating device 126 may include one or more projection optics (e.g., lenses, or the like) to project the desired pattern onto the workpiece 120. As another example, the templating device 126 may include beam-scanning optics (e.g., galvo mirrors, or the like) to scan illumination in the desired pattern. By way of another example, the templating device 126 or the automated layup table 102 more generally may include components to adapt a laser pattern to a position of the workpiece. For instance, the automated layup table 102 may include a rotatable or positionable platform coupled to an encoder to provide angular or other position information associated with the workpiece 120 to the templating device 126.

The templating device 126 may operate using any suitable technique. In some embodiments, the templating device 126 implements an AIQC module 118 to provide AI-guided placement of laser patterns. For example, the AIQC module 118 may receive one or more images of the workpiece 120 from the monitoring equipment 114, detect an orientation of the workpiece 120 from the images using an AI model, and project a desired placement outline (e.g., a pattern) based on the orientation. Further, the templating device 126 may continually update the projected placement outline in the case of movements or vibrations of the workpiece 120 or the automated layup table 102.

The AIQC module 118 of the templating device 126 may provide 2D or 3D orientation detection and tracking of the workpiece 120. For example, the AIQC module 118 of the templating device 126 may provide 2D orientation detection using images from a single detector in the monitoring equipment 114. As another example, the AIQC module 118 of the templating device 126 may provide 3D orientation detection using depth information provided by images from two spatially-separated detectors in the monitoring equipment 114, a depth sensor (e.g., a LIDAR sensor, or the like), or any other suitable depth-mapping technique.

It is contemplated herein that an automated layup table 102 with a dedicated templating device 126 may provide superior flexibility, mobility, and robust operation relative to alternative techniques in which a common templating device (e.g., a common laser scanner) is utilized for multiple workstations.

The data stored by the memory medium 108 may include, but is not limited to, identifying information associated with a particular composite material 112, identifying information associated with various material plies 122 used to form the composite material 112, identifying information associated with operators performing various process steps, monitoring data generated by an automated layup table 102, quality control data associated with AI-guided quality control modules, or testing data generated by the testing equipment 104 (e.g., associated with compliance or non-compliance of the composite material 112 or the workpiece 120 more generally). This data may then be used to train and/or update the training of various AI-guided quality control modules.

The testing equipment 104 may include any type of equipment suitable for testing a composite material 112 at a selected step in a fabrication process, which may be carried out prior to or after a curing step. For example, the testing equipment 104 may include defect-scanning equipment such as, but not limited to, ultrasonic scanning equipment. In this way, the testing equipment 104 may generate various scan maps of a composite material 112 (e.g., C-scan maps, A-scan maps, or the like) that may indicate the presence of defects or other quality issues in the composite material 112. By way of another example, the testing equipment 104 equipment may include stress testing equipment. In this way, the testing equipment 104 may expose a composite material 112 to various environmental conditions (e.g., temperature, pressure, mechanical stress, chemical conditions, or the like) corresponding to operational and/or non-operational (e.g., extreme) conditions and evaluate the resiliency of the testing equipment 104. By way of another example, the testing equipment 104 equipment may include performance testing equipment. In this way, the testing equipment 104 may evaluate the operational performance of the composite material 112. In a general sense, testing data provided by the testing equipment 104 may provide an indication of a quality of a composite material 112 and further whether the composite material 112 or workpiece more generally complies or fails to comply with particular quality control standards, which may be used as feedback data to train and/or update the training of an AIQC module 118 to identify quality issues at a particular process step that may be linked to the testing data or as feedforward data to update fabrication process steps to promote fabrication within selected quality tolerances.

In some embodiments, the AI-guided composite fabrication system 100 includes a controller 128. The controller 128 may include one or more processors 130 configured to execute program instructions or sets of program instructions (e.g., modules). As used herein, the term module describes a set of program instructions that may be executed by one or more processors 130. For example, an AIQC module 118 may include a set of program instructions for executing various steps described throughout the present disclosure. In this regard, the one or more processors 130 of controller 128 may generally execute any of the various process steps described throughout the present disclosure. In some embodiments, the program instructions are stored on the memory medium 108. Further, the controller 128 may be communicatively coupled to external components (e.g., an external server, or the like) to send or receive data, operational instructions, configuration data, or the like.

The one or more processors 130 of a controller 128 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 130 may include any hardware and/or software device configured to execute algorithms and/or instructions. In some embodiments, the one or more processors 130 are embodied within a desktop computer, mainframe computer system, workstation, image computer, parallel processor, networked computer, or any other computer system configured to execute a program configured to operate or operate in conjunction with the AI-guided composite fabrication system 100, as described throughout the present disclosure.

The memory medium 108 may include any storage medium known in the art suitable for storing program instructions executable by the associated one or more processors 130. For example, the AI-guided composite fabrication system 100 may include a non-transitory memory medium. By way of another example, the memory medium 108 may include, but is not limited to, a read-only memory (ROM), a random-access memory (RAM), a magnetic or optical memory device (e.g., disk), a magnetic tape, a solid-state drive and the like. It is further noted that memory medium 108 may be housed in a common controller housing with the one or more processors 130. In one embodiment, the memory medium 108 may be located remotely with respect to the physical location of the one or more processors 130 and controller 128. For instance, the one or more processors 130 of controller 128 may access a remote memory (e.g., server), accessible through a network (e.g., internet, intranet and the like).

It is contemplated herein that an AI-guided composite fabrication system 100 may be implemented in a variety of ways depending on the requirements of a given application. For example, an AI-guided composite fabrication system 100 may include any number of automated layup tables 102, where any particular automated layup table 102 may optionally utilize data generated by any of the automated layup tables 102 in the AI-guided composite fabrication system 100. In some embodiments, the configuration of an AI-guided composite fabrication system 100 may be adjustable. For example, a number of automated layup tables 102 in operation and/or the connectivity or data sharing between the automated layup tables 102 may be adjustable.

In some embodiments, an AI-guided composite fabrication system 100 includes a single automated layup table 102. Such a system may provide AI-guided quality control for any number of process steps. In some embodiments, an AI-guided composite fabrication system 100 includes multiple automated layup tables 102, where each automated layup table 102 provides AI-guided quality control for a different set of process steps. In this way, different automated layup tables 102 may be tailored for different process steps. For example, different automated layup tables 102 may have different physical sizes, monitoring equipment, or the like. In some embodiments, an AI-guided composite fabrication system 100 includes multiple automated layup tables 102 for parallel fabrication of composite materials 112, where each automated layup table 102 provides AI-guided quality control for the same process steps. In a general sense, an AI-guided composite fabrication system 100 may include any combination of one or more automated layup tables 102 tailored for any number of process steps. Further, in some embodiments, an automated layup table 102 may be configurable to operate within a AI-guided composite fabrication system 100 in a variety of different modes.

It is further contemplated herein that the controller 128 may be implemented in various configurations. For example, the steps described throughout the present disclosure may be carried out by a single controller or, alternatively, multiple controllers. Additionally, the controller 128 may include one or more controllers housed in a common housing or within multiple housings. In this way, any controller or combination of controllers may be separately packaged in a manner suitable for integration into AI-guided composite fabrication system 100.

In some embodiments, the controller 128 is integrated within or distributed between various components of the AI-guided composite fabrication system 100. For example, any or all of the automated layup tables 102 may include processors 130 and/or a memory medium 108. In this way, any or all of the automated layup tables 102 may at least partially implement AI-guided quality control on local components. Further, data generated by an automated layup table 102 may be stored on a local memory medium 108. In some embodiments, the controller 128 or a portion thereof is provided as a standalone component that may be communicatively coupled to any other components of the AI-guided composite fabrication system 100. For example, the controller 128 may include a server including processors 130 and/or a memory medium 108 accessible by any or all of the automated layup tables 102. In this way, any or all of the automated layup tables 102 may at least partially implement AI-guided quality control on remote components.

It is thus to be understood that the depiction of the controller 128 in FIG. 1 is provided solely for illustrative purposes and that any steps in the present disclosure may be implemented on any suitable configuration of the controller 128.

In some embodiments, the AI-guided composite fabrication system 100 includes an operator interface 132, which may be communicatively coupled to the controller 128. The operator interface 132 may include any combination of components suitable for receiving information from or providing information to an operator 110.

In some embodiments, the operator interface 132 includes a human machine interface (HMI) suitable for receiving information from or providing information to a human operator 110. For example, the operator interface 132 may include a user input device 134 for receiving information from a human operator 110. The user input device 134 may include, but is not limited to, a touchscreen interface, a mouse, a keyboard, or a stylus. By way of another example, the user input device 134 includes a voice input device suitable for receiving verbal input from an operator 110. As another example, the operator interface 132 may include a display interface 136 for providing information to an operator 110. The display interface 136 may include a display screen such as, but not limited to, a liquid crystal display (LCD), an organic light-emitting diode (OLED) based display, or a CRT display. Further, a common device may be used for input and output functionality. For instance, a touchscreen interface sensitive to a stylus and/or fingers may be suitable for both input and output functionality. Alternatively or additionally, the display interface 136 may include an optical projection device such as, but not limited to, an image projector or a laser projector. In this way, the display interface 136 may display information directly on a workpiece 120 or another suitable surface.

In some embodiments, the operator interface 132 is suitable for receiving information from or providing information to a robotic operator 110. For example, the operator interface 132 may include program instructions (e.g., executable by the controller 128) suitable for interfacing with the robotic operator 110 to send or receive data. In this way, the operator interface 132 may operate as, but is not required to operate as, an intermediary between one or more AIQC modules 118 and the robotic operator 110.

Figure 2:
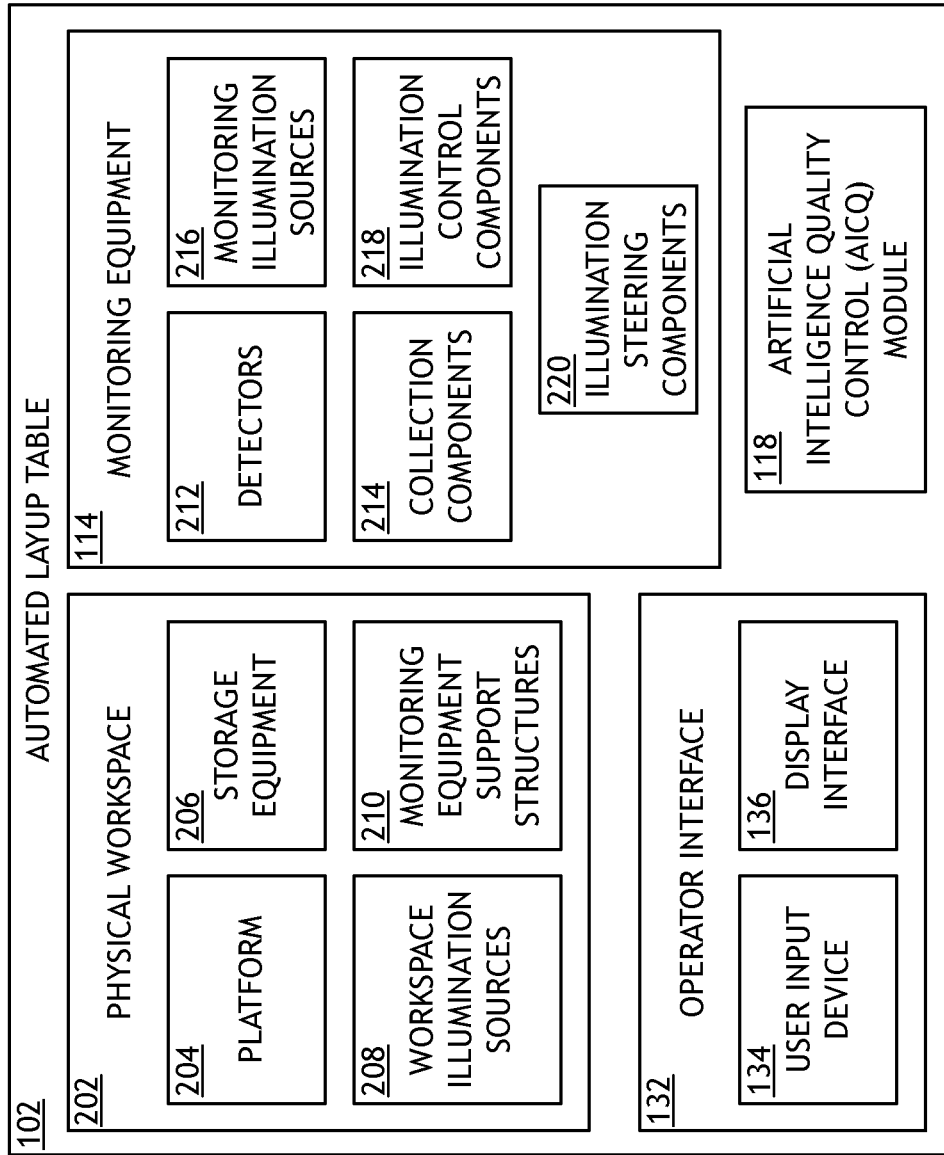
FIG. 2 is a conceptual view of an automated layup table, in accordance with one or more embodiments of the present disclosure.

Referring now to FIGS. 2-4B, various aspects of an automated layup table 102 are described in greater detail in accordance with one or more embodiments of the present disclosure. FIG. 2 is a conceptual view of an automated layup table 102, in accordance with one or more embodiments of the present disclosure.

In some embodiments, an automated layup table 102 includes various components to provide a physical workspace 202 for carrying out any of the various process steps associated with the fabrication of a composite material 112. In some embodiments, an automated layup table 102 includes one or more components to physically position or secure a workpiece 120 such as, but not limited to, a platform 204, clamps, or translation stages (e.g., linear, rotational, and/or angular actuators). The physical workspace 202 may include storage equipment 206 such as, but not limited to, one or more shelves, cabinets, compartments, or the like for storing equipment that an operator 110 may use to implement various process steps. As another example, the automated layup table 102 may include one or more workspace illumination sources 208 for illuminating the physical workspace 202. For instance, a workspace illumination source 208 may include one or more fixed or positionable lamps to provide increased visibility of the workpiece 120 to the operator 110. As another example, the automated layup table 102 may include power sources such as, but not limited to, electrical outlets or batteries to power equipment used to carry out various process steps. As another example, the automated layup table 102 may include monitoring equipment support structures 210 to mount and/or position the monitoring equipment 114 or any components therein.

An automated layup table 102 may generally have any desired size or shape and may thus be tailored for any particular application, workpiece size, or fabrication process. As an illustration, the platform 204 may be at least 40 inches on a side and be suitable for supporting workpieces 120 of 120 pounds or more. As another illustration, various equipment such as, but not limited to, the monitoring equipment 114 or the templating device 126 are mounted at least 54 inches from the platform 204 to avoid interference with other objects on or near the platform 204.

Further, any of the components for physically positioning or securing a workpiece may be adjustable. In this way, the automated layup table 102 may be adapted to different sizes and/or shapes of a workpiece 120, different process steps, or the like. In some embodiments, the automated layup table 102 may include a platform 204 in which at least one of an angle or height is adjustable. For example, the platform 204 may be adjustable between a horizontal position and at least a +/−45-degree rotational position to allow the operator 110 to access the workpiece 120 from different angles. Further, the platform 204 may be positionable to any selected angle within an operating range and/or may include hard stops at selected angles. As another example, the height of the platform 204 and/or any other components (e.g., the monitoring equipment 114, the templating device 126, or the like) may be adjustable. As an illustration, the height of the platform 204 may be adjustable within a range of 30-47 inches from the floor.

In some embodiments, an automated layup table 102 is moveable. For example, an automated layup table 102 may include wheels (e.g., lockable wheels, adjustable casters, or the like) to facilitate positioning in any selected location or orientation. By way of another example, an automated layup table 102 may be sized to fit through a door of a selected size (e.g., 80 inches) to enable placement in various rooms of a fabrication facility. In some cases, an automated layup table 102 includes retractable components such that a height and/or width may be adjusted. As an illustration, an automated layup table 102 may include retractable monitoring equipment 114 to adjust the height of the automated layup table 102 to be below a door height during transport. The monitoring equipment may then be adjusted to any selected height during operation (e.g., via the monitoring equipment support structures 210).

It is to be understood that the automated layup table 102 may have any fixed or adjustable shape, size, or orientation. Accordingly, any references to physical dimensions or designs are provided solely for illustrative purposes and should not be interpreted as limiting.

The monitoring equipment 114 may include any number of components suitable for monitoring the workpiece 120 and/or the operator 110 as various process steps are carried out. In this way, the monitoring data 116 may include any combination of data associated with the workpiece 120 or the operator 110 (e.g., the identity of the operator 110, various actions or movements performed by the operator 110, or the like). For example, the monitoring data 116 may include, but is not limited to, real-time data generated as an operator 110 performs an action on the workpiece 120 or post-process data generated after the operator 110 finishes an action on the workpiece 120.

The monitoring equipment 114 may include any number or type of detectors 212 known in the art.

In some embodiments, the monitoring equipment 114 includes one or more optical detectors 212 suitable for generating monitoring data 116 associated with light emanating from an object of interest such as, but not limited to, the workpiece 120, the operator 110, or any component of the physical workspace 202 provided by the automated layup table 102. For example, an optical detector 212 may include a single-pixel (1D) sensor such as, but not limited to, a photodiode, an avalanche photodiode, or a photomultiplier tube. As another example, an optical detector 212 may include a two-dimensional (2D) sensor suitable for generating images and/or video of an object of interest such as, but not limited to, a charge-coupled device (CCD) or a complementary metal-oxide-semiconductor (CMOS) device. Further, an optical detector 212 may be sensitive to any wavelength of electromagnetic radiation such as, but not limited to, wavelengths ranging from ultraviolet to infrared wavelengths. In this way, the term optical detector 212 is broadly used herein to encompass wavelengths outside the visible spectrum and may include, but is not limited to, thermal detectors (e.g., thermal imagers) operating in the infrared wavelengths.

In some embodiments, the monitoring equipment 114 includes one or more radio-frequency (RF) detectors 212. For example, an RF detector 212 may include, but is not limited to, a radio-frequency identification device (RFID) reader suitable for receiving identifying information about a workpiece 120 and/or an operator 110.

In some embodiments, the monitoring equipment 114 includes one or more vacuum detectors 212. For example, a vacuum detector 212 may generate monitoring data associated with a de-bulk step such as, but not limited to, a vacuum strength or a vacuum duration.

In some embodiments, the monitoring equipment 114 includes collection components 214 to collect light or other radiation from objects of interest and direct it to one or more detectors 212. For example, the collection components 214 may include one or more lenses to collect light emanating from an object of interest and focus this light onto a detector 212. As another example, the collection components 214 may include one or more lenses to generate an image of an object of interest on a detector 212. As another example, the collection components 214 may include one or more antennas to collect RF radiation emanating from the object of interest.

It is contemplated herein that any of the various detectors 212 may be operated independently or in combination and further contemplated herein that the configuration of the various detectors 212 may be adjustable. In this way, a particular detector 212 may be configured to operate in different modes or provide different functions suitable for monitoring one or more process steps. As an illustration, the monitoring equipment 114 may include two or more 2D detectors 212 that may be operated independently to provide images and/or videos or operated in combination to provide stereo imaging for depth mapping, machine vision applications, or the like.

In some embodiments, the monitoring equipment 114 includes one or more monitoring illumination sources 216 suitable for illuminating an object of interest to facilitate the capture of monitoring data 116 by one or more detectors 212. For the purposes of the present disclosure, the term illumination is used to broadly describe a stimulus that may be the basis for a detection technique. For example, illumination generated by a monitoring illumination source 216 may include electromagnetic radiation such as, but not limited to, ultraviolet (UV) light, visible light, infrared (IR) light, or radio waves. As another example, illumination generated by a monitoring illumination source 216 may include sound waves such as, but not limited to, ultrasonic waves.

In some embodiments, the monitoring equipment 114 utilizes external components as a monitoring illumination source 216. As an illustration in the context of optical imaging, lights associated with a room in which the automated layup table 102 is located may take the place of or supplement a monitoring illumination source 216.

In some embodiments, an automated layup table 102 may utilize an illumination source for different applications or in different modes. For example, the automated layup table 102 may include an illumination source that may operate both as a workspace illumination source 208 and a monitoring illumination source 216. It is thus to be understood that a description of any component of the automated layup table 102 is merely an illustration and does not imply that a discrete component is required.

In some embodiments, the monitoring equipment 114 includes an optical monitoring illumination source 216 for generating optical and/or thermal illumination (e.g., electromagnetic radiation having wavelengths in the UV to IR spectral bands. In the case of IR or thermal illumination, such a monitoring illumination source 216 may be referred to as a heat source or a thermal source. An optical monitoring illumination source 216 may include any type or combination of optical illumination sources known in the art such as, but not limited to, one or more light-emitting diode (LED) sources, one or more lamp sources, or one or more laser sources. Further, an optical monitoring illumination source 216 may have any desired properties such as, but not limited to, spectral properties, temporal properties, or coherence properties. For example, a particular monitoring illumination source 216 may provide narrowband illumination including one or more selected wavelengths or broadband illumination including one or more selected wavelength ranges. As another example, a particular monitoring illumination source 216 may have any selected temporal profile such as, but not limited to, a continuous-wave profile, a pulsed profile, or an intensity-modulated profile. As another example, a particular monitoring illumination source 216 may have any selected spatial or temporal coherence length.

In some embodiments, the monitoring equipment 114 includes one or more illumination control components 218 to manipulate various properties of light provided by one or more monitoring illumination sources 216 and/or light emanating from an object of interest prior to detection with one or more detectors 212. For example, the illumination control components 218 may include, but are not limited to, polarizers, spectral filters, neutral density filters, homogenizers, or beam shapers. As another example, the illumination control components 218 may include one more lenses, stops, apertures, or the like to control a spatial or angular extent of illumination from one or more monitoring illumination sources 216 on an object of interest. As another example, the illumination control components 218 may include a mask or other component to generate structured or patterned light, which may be suitable for, but is not limited to, machine vision applications.

In some embodiments, the monitoring equipment 114 includes one or more illumination steering components 220 to direct illumination from the one or more monitoring illumination sources 216 to objects of interest. For example, the illumination steering components 220 may include one or more beam deflectors to control a position of illumination on an object of interest such as, but not limited to, beam scanners, galvanometers (e.g., galvo mirrors), deformable mirrors, or actuatable mirrors (e.g., piezoelectric mirrors, or the like). As an illustration, a laser-based monitoring illumination source 216 coupled to illumination steering components 220 may operate as a laser scanner. As another example, the illumination steering components 220 may include one or more projection optical elements such as, but not limited to lenses, that are suitable for projecting one or more patterns of illumination onto a workpiece 120. For example, the illumination steering components 220 may operate as a projector or projection system to project a pattern of illumination (e.g., laser illumination or any other suitable illumination) onto the workpiece 120 for the purposes of ply templating (e.g., where the pattern corresponds to a template for orienting a ply), machine vision, or any other suitable purpose.

Figure 3A:
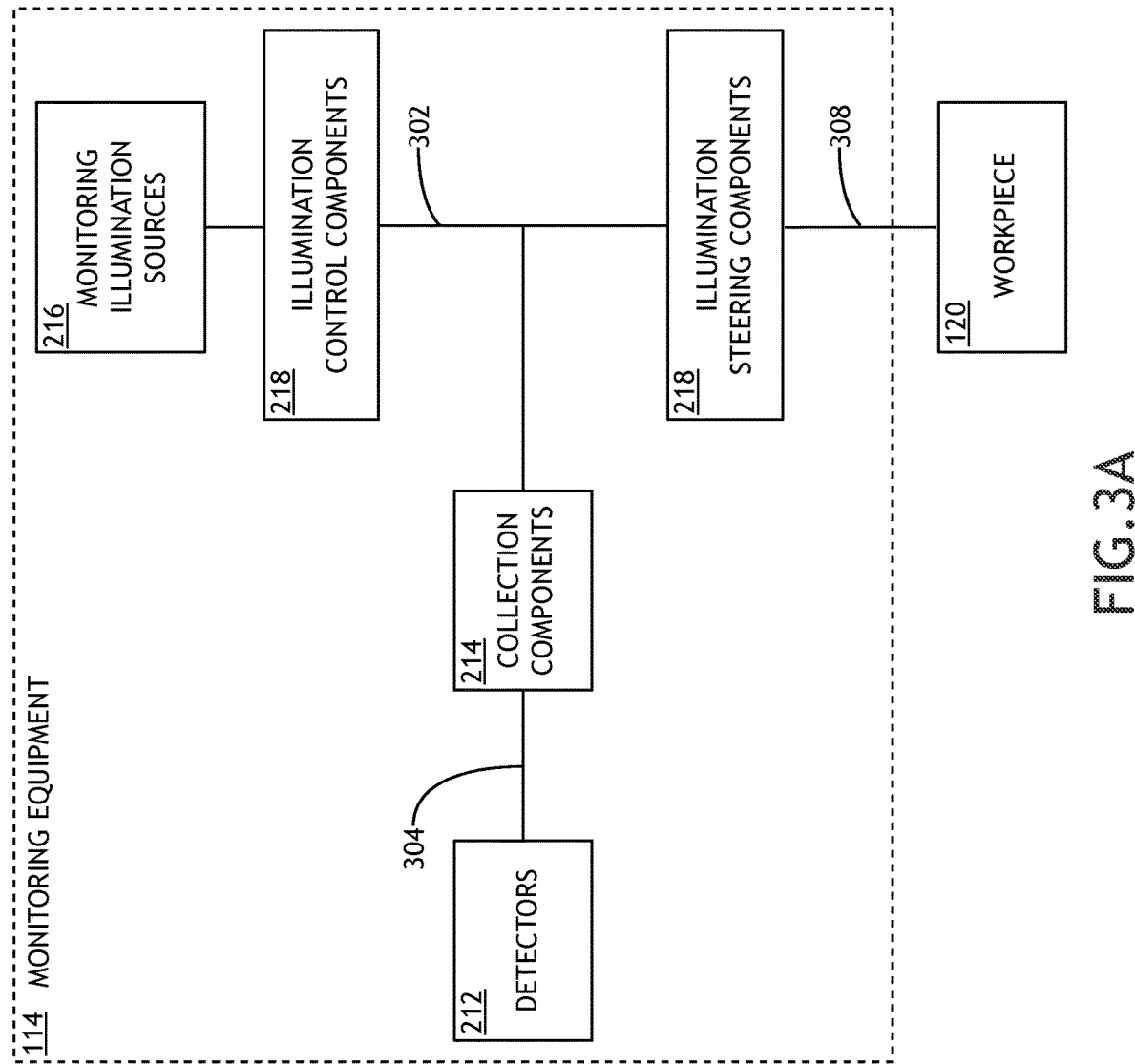
FIG. 3A is a conceptual view of a monitoring equipment providing illumination and collection along a common path, in accordance with one or more embodiments of the present disclosure.
Figure 3B:
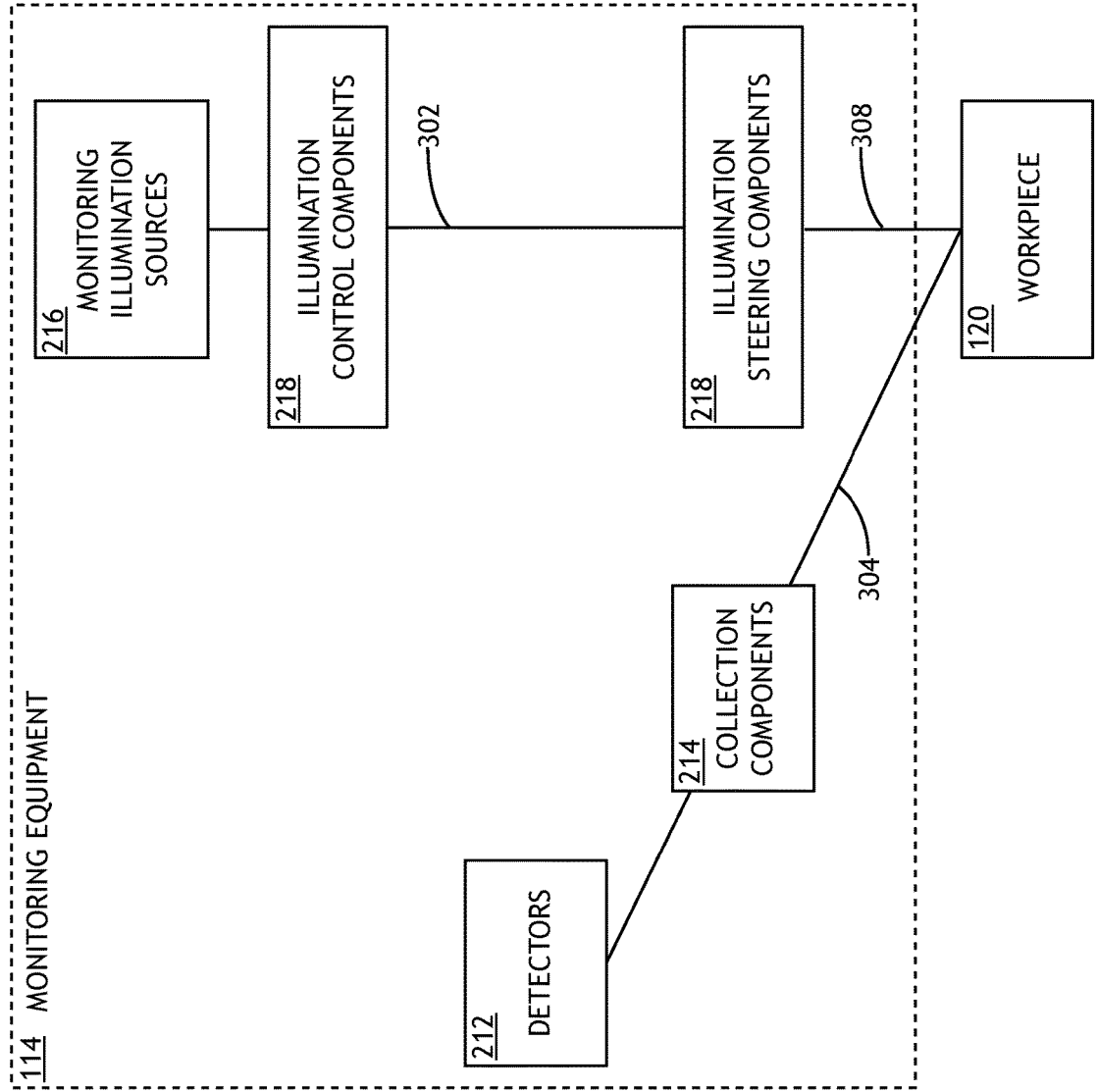
FIG. 3B is a conceptual view of a monitoring equipment providing illumination and collection different paths, in accordance with one or more embodiments of the present disclosure.
Figure 3C:
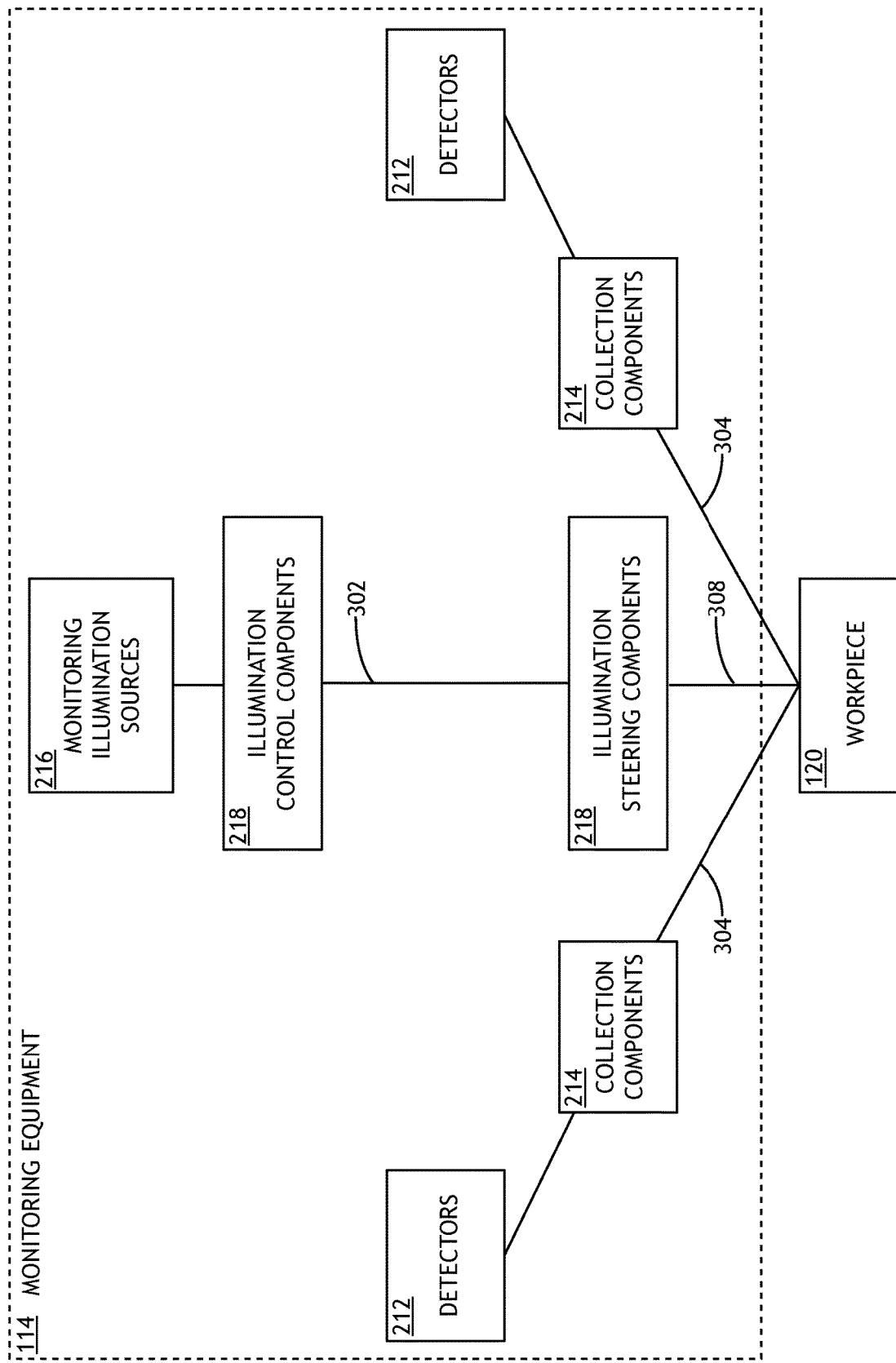
FIG. 3C is a conceptual view of a monitoring equipment providing two spatially-separated imaging detectors, in accordance with one or more embodiments of the present disclosure.

FIGS. 3A-3C illustrate various non-limiting configurations of monitoring equipment 114.

FIG. 3A is a conceptual view of a monitoring equipment 114 providing illumination and collection along a common path, in accordance with one or more embodiments of the present disclosure. The configuration of the monitoring equipment 114 illustrated in FIG. 3A may be particularly useful for, but not limited to, optical illumination and detection. In FIG. 3A, a monitoring equipment 114 includes monitoring illumination source 216 to direct illumination 302 to a workpiece 120, a detector 212 to capture a measurement signal 304 from the workpiece 120 in response to the illumination 302, and a beamsplitter 306 to provide a common path 308 for the illumination 302 and the measurement signal 304 to and from the workpiece 120. FIG. 3A further illustrates illumination control components 218 for manipulating various aspects of the illumination 302 and collection components 214 for manipulating various aspects of the measurement signal 304 prior to detection. Although not shown, the monitoring equipment 114 may further include illumination steering components 220 at any suitable location such as, but not limited to, in the common path 308 to facilitate monitoring of different portions of the workpiece 120.

In some embodiments, although not shown, the monitoring equipment 114 may include multiple illumination and/or collection channels. For example, the monitoring equipment 114 may include any number of beamsplitters to split and/or combine light into the various channels. In this way, the path of the incident illumination 302 and/or the measurement signal 304 to and from the workpiece 120 may be substantially the same for any channel.

FIG. 3B is a conceptual view of a monitoring equipment 114 providing illumination and collection different paths, in accordance with one or more embodiments of the present disclosure. The configuration of FIG. 3B is similar to the configuration of FIG. 3A except that the illumination 302 and the measurement signal 304 need not propagate along a common path. The configuration of FIG. 3B may be suitable for a wide range of detection techniques with any type of monitoring illumination source 216 and associated detector 212. Further, this configuration may be well suited for a monitoring equipment 114 with multiple monitoring illumination sources 216 and/or detectors 212. In particular, this configuration may avoid signal losses associated with multiple beamsplitters used to create illumination and/or collection channels.

FIG. 3C is a conceptual view of a monitoring equipment 114 providing two spatially-separated imaging detectors 212, in accordance with one or more embodiments of the present disclosure. For example, the imaging detectors 212 may be spaced apart by a distance (d) to provide stereo vision, which may be suitable for, but is not limited to, depth measurements on the workpiece 120. The monitoring equipment 114 may further provide any suitable illumination such as, but not limited to, scanned illumination (e.g., using a laser monitoring illumination source 216 coupled to illumination steering components 220) or structured illumination.

Referring now to FIGS. 4A-5B, AI-guided quality control using an automated layup table 102 is described in greater detail in accordance with one or more embodiments of the present disclosure.

An automated layup table 102 may include various components to implement AI-guided quality control for any number of process steps such as, but not limited to, the monitoring equipment 114 or hardware or software for implementing one or more AIQC modules 118 associated with one or more process steps. For example, the AIQC modules 118 may be implemented by the controller 128. As described previously herein, the controller 128 may be implemented in a wide variety of configurations such as, but not limited to, a standalone component connected to an automated layup table 102 or an integrated component of an automated layup table 102. Further, the AIQC modules 118 associated with different process steps may be implemented by common components, by separate components, or a combination thereof. In this way, it is to be understood that descriptions of an automated layup table 102 implementing an AIQC module 118 are merely illustrative and should not be interpreted as limiting to any particular configuration.

In some embodiments, an automated layup table 102 or a combination of multiple automated layup tables 102 implements one or more AIQC modules 118 to provide AI-guided quality control for various process steps based at least in part on monitoring data 116 associated with the relevant process steps. Further, at least some of the AIQC modules 118 may be tailored to provide quality control assessments for particular process steps. In some embodiments, an automated layup table 102 or a combination of multiple automated layup tables 102 implements two or more AIQC modules 118 to provide AI-guided quality control for various process steps based at least in part on monitoring data 116 associated with the relevant process steps. In this way, an AIQC module 118 associated with one of the process steps may be trained and/or updated based on monitoring data 116 from the other AIQC modules 118 associated with other process steps.

In particular, an AIQC module 118 tailored for a particular process step may receive monitoring data 116 associated with the process step and potentially other previous process steps as input data. This monitoring data 116 may include data associated with the workpiece 120 (e.g., a mold 124 and/or one or more plies 122) and/or the operator 110 performing the particular process step. This monitoring data 116 may thus characterize any combination of the techniques used to implement the process step (e.g., the particular actions of the operator 110), any intermediate changes to the workpiece 120 during the process step, or a state of the workpiece 120 after the process step is completed (or at least attempted).

Such a step-specific AIQC module 118 may then generate quality control data 402 as output data using an AI model. The quality control data 402 may thus provide an assessment of the quality of the workpiece 120 and/or an action of the operator 110 with respect to the process steps. For example, the AI model implemented by the AIQC module 118 may correlate patterns in the monitoring data 116 to a quality of the workpiece 120 (e.g., based on testing data 106 or any other suitable metric). Various types of quality control data 402 are contemplated herein. For instance, the quality control data 402 may relate to the presence of any nonconformances or defects such as, but not limited to, wrinkles, bridges, foreign objects, or the like. In another instance, the quality control data 402 may relate more broadly to the state of the workpiece 120 and/or the actions of the operator 110. As described throughout, it may be the case that different patterns in the monitoring data 116 across one or more process steps may impact the overall quality of the completed composite material 112. As an illustration, a particular technique for implementing a process step (e.g., a technique for working a ply 122 into a mold 124 during layup) may tend to more reliably produce higher quality composite materials 112 (e.g., as quantified by testing data 106 or any suitable metric based on a statistical analysis of composite materials 112 over time) than other techniques. In this way, an AIQC module 118 as disclosed herein may provide quality control data 402 related to positive measures of quality and is not limited to the detection of defects or traditional nonconformances.

In some embodiments, the quality control data 402 includes a pass indicator or a fail indicator for the particular process step. In this way, the AIQC module 118 may provide actionable data indicative of a likelihood that the completed composite material 112 will have a desired quality (e.g., as quantified by testing data 106 or any suitable metric).

Various quality control outputs 404 may then be generated based on this quality control data 402 and presented to the operator 110 using any technique known in the art such as, but not limited to, the operator interface 132. The operator 110 may then take necessary actions such as, but not limited to, performing corrective action in response to an identified quality issue, scrapping the workpiece 120 if an unrecoverable quality issue is detected, or proceeding to a subsequent process step if the quality is within an acceptable tolerance. Additionally, the operator 110 may either verify or override the quality control outputs 404. Upon receipt of the verification or override, the AIQC module 118 may update the AI model accordingly. Further, the AIQC module 118 may update the AI model based on testing data 106 of a completed composite material 112. In some embodiments, either or both of these AI model update steps may be subject to verification by at least one additional user (e.g., at least one additional human user). In this way, the integrity of the AI model training and updating may be controlled.

FIG. 4A is a block-level flow diagram of a AI-guided composite fabrication system 100 providing an ply 122 that implements multiple AIQC modules 118 for AI-guided quality control of multiple process steps, in accordance with one or more embodiments of the present disclosure. It is to be understood that the illustration of a single automated layup table 102 in the AI-guided composite fabrication system 100 is provided solely for illustrative purposes an should not be interpreted as limiting. Rather, an AI-guided composite fabrication system 100 may include any number of automated layup tables 102, any of which may include any number of AIQC modules 118 tailored for any process steps for fabricating one or more composite materials 112. Multiple automated layup tables 102 may then be connected either directly or via other components such as the controller 128, a network, or the like.

FIG. 4A illustrates a generalized example of an automated layup table 102 implementing a first AIQC module 118-1 associated with Process Step 1, a second AIQC module 118-2 associated with Process Step 2, and a third AIQC module 118-3 associated with Process Step 3. It is contemplated herein that a fabrication process may be divided into any number of process steps and/or actions to be performed by an operator 110 and that AI-guided quality control may be implemented for any number of such process steps and/or actions. In this way, any potential quality issues associated with the workpiece 120 may be identified and potentially corrected as they occur. Similarly, any patterns or techniques related to the monitoring data 116 for the particular process step or other process steps may be identified and used to promote fabrication of the completed composite material 112 in a manner that meets or exceeds quality standards (e.g., based on testing data 106 or any other suitable metric).

As an illustration, a process for fabricating a composite material 112 may broadly include the steps of sequentially laying up two or more plies 122 on a mold 124, a step of de-bulking the plies 122, a step of curing the plies 122 to form the composite material 112, and a step of trimming the cured composite material 112. In this conceptualization, the actions of the operator 110 may include laying up the plies 122, de-bulking the workpiece 120, curing the composite material 112, and trimming the composite material 112, where quality control data 402 may be generated based on monitoring data 116 associated with each of these steps. For example, an automated layup table 102 may generate quality control data 402 after the layup of a particular ply 122 on the workpiece 120 (e.g., assessing various aspects such as the orientation of the ply 122, the quality of the ply 122 placement, or the presence of foreign objects on the ply 122), after the de-bulking step assessing the quality of the vacuum, after a trimming step assessing the final shape, or the like.

However, each of these process steps may be further divided into additional steps or sub-steps. In the present disclosure, the distinction between steps and sub-steps is merely illustrative and may each be considered a separate process step that may have a dedicated AIQC module 118. For example, a step of laying up a ply 122 may include the steps of inspecting the workpiece 120 prior to ply placement (e.g., for foreign objects), removing backing material from the ply, inspection of whether backing material is properly removed, placing the ply in a desired orientation on the mold 124, working the ply to conform to the mold 124, and final inspection of the ply 122. In this conceptualization, the actions of the operator 110 may include positioning the workpiece 120 for inspection prior to ply placement, removing the backing from the ply, positioning the ply 122 for inspection the ply prior to placement, placing the ply into a desired orientation, working the ply into the mold 124, and positioning the workpiece 120 for final inspection, and performing various final inspection steps (e.g., foreign object detection, bridge/wrinkle detection, or the like). Various quality control data 402 may then be generated for each of these steps (e.g., process steps) and/or actions. The flow illustrated in FIG. 4A may thus be carried out for any conceptualization of any process step or operator action and may be implemented any number of times for any number of processor steps or actions. In some embodiments, various aspects of AI-guided quality control illustrated in FIG. 4A may be implemented in parallel (e.g., using multiple automated layup tables 102).

As described previously herein, the AI-guided composite fabrication system 100 may include a memory medium 108 to store a wide range of data from any components of the AI-guided composite fabrication system 100 as well as externally-provided data (e.g., externally-provided training data). This memory medium 108 may then be communicatively coupled with any component of the AI-guided composite fabrication system 100 (e.g., to provide, receive and/or store data or instructions. For example, as illustrated in FIG. 4A, the memory medium 108 may receive data from the monitoring equipment 114 (e.g., monitoring data 116), the testing equipment 104 (e.g., testing data), or any of the AIQC modules 118 (e.g., quality control data 402). As a result, any of the AIQC modules 118 may have access to any of the data stored on the memory medium 108 which may be used for any purpose including, but not limited to, initial training, updated training, or run-time operation.

It is contemplated that that such a configuration may provide highly sensitive quality control for composite manufacturing based at various levels of granularity. The examples below are illustrated with a non-limiting case of a process step including foreign object detection. However, it is to be understood that these illustrations should not be interpreted as limiting and that an AIQC module 118 may implement AI-guided process control for any process step associated with the fabrication of a composite material 112.

At one level, an AIQC module 118 associated with a particular process step may facilitate iteratively improving quality control data 402 for the particular process step. In FIG. 4A, this is illustrated by the feedback arrows 406 from the output to the input of each AIQC module 118. As an illustration in the context of foreign object detection, an AIQC module 118 associated with a step of foreign object detection may, using AI techniques, provide iteratively improving detection and/or classification of various foreign objects and may thus provide more effective and efficient quality control. Put another way, the feedback arrows 406 may facilitate robust training of the AIQC module 118 (e.g., an associated AI model of the AIQC module 118) for the task associated with the process step in a manner than does not necessarily depend on the impact on the ultimate quality of the completed composite material 112. In the case of foreign object detection, this may mean robust training of the AIQC module 118 for the detection of any foreign objects on a workpiece 120 regardless of the impact on the ultimate quality of the completed composite material 112.

At another level, training or updating an AIQC module 118 (e.g., an AI model therein) with testing data 106 from testing equipment 104 at one or more stages of fabrication may allow the AIQC module 118 to identify correlations between monitoring data 116 at a particular process step and the reliability or performance of a final composite material 112. This is illustrated in FIG. 4A by the storage of testing data on the memory medium 108, which is available to each AIQC module 118, though it is to be understood that direct connections are also within the spirit and scope of the present disclosure. In contrast to the feedback arrows 406, training and/or updating an AIQC module 118 with testing data 106 may relate the monitoring data 116 at the particular process step to the quality of the completed composite material 112 as quantified by the testing data 106. Continuing the illustration of foreign object detection, it may be the case that not all foreign objects have an equivalent impact on ultimate reliability or performance of the final composite material 112. An AIQC module 118 trained or updated with testing data from testing equipment 104 may effectively identify not only the presence of foreign objects, but predict the impact of such foreign objects. As a result, the AIQC module 118 may provide quality control data 402 and/or quality control outputs 404 weighted based on these considerations.

At another level, the use of multiple AIQC modules 118 on one or more automated layup tables 102 to provide AI-guided quality control for multiple process steps may allow the automated layup table 102 to identify correlations between monitoring data 116 generated at the multiple process steps and the ultimate quality of the final composite material 112. This is illustrated in FIG. 4A by the feedback loop from the outputs of each AIQC module 118 to all other AIQC modules 118 via the memory medium 108, though it is to be understood that direct connections are also within the spirit and scope of the present disclosure. Continuing the illustration of foreign object detection, it may be the case that a particular number or type of foreign objects is acceptable in isolation, but may lead to poor quality when combined with a different quality issue at another step (e.g., a wrinkle in the same location of the same or different layer). Accordingly, an AIQC module 118 may generate quality control data 402 and/or quality control outputs 404 based on these considerations.

At another level, the use of AIQC modules 118 on multiple automated layup tables 102 in a AI-guided composite fabrication system 100 (not shown in FIG. 4A) may increase the sensitivity or efficiency of AI-guided quality control by increasing the amount of data used to train or update the constituent AIQC modules 118.

It is to be understood that this illustration in the context of foreign object detection is merely an illustration and that this approach may be extended to a wide range of process steps and associated monitoring data 116 such as, but not limited to, backing detection, assessment of the quality of a worked ply (e.g., bridge inspection, wrinkle inspection, or the like), mold inspection, or laser outlining for ply placement. Further, the descriptions above may be extended to the identification of patterns or techniques that tend to result in a high-quality composite material 112.

Figure 4B:
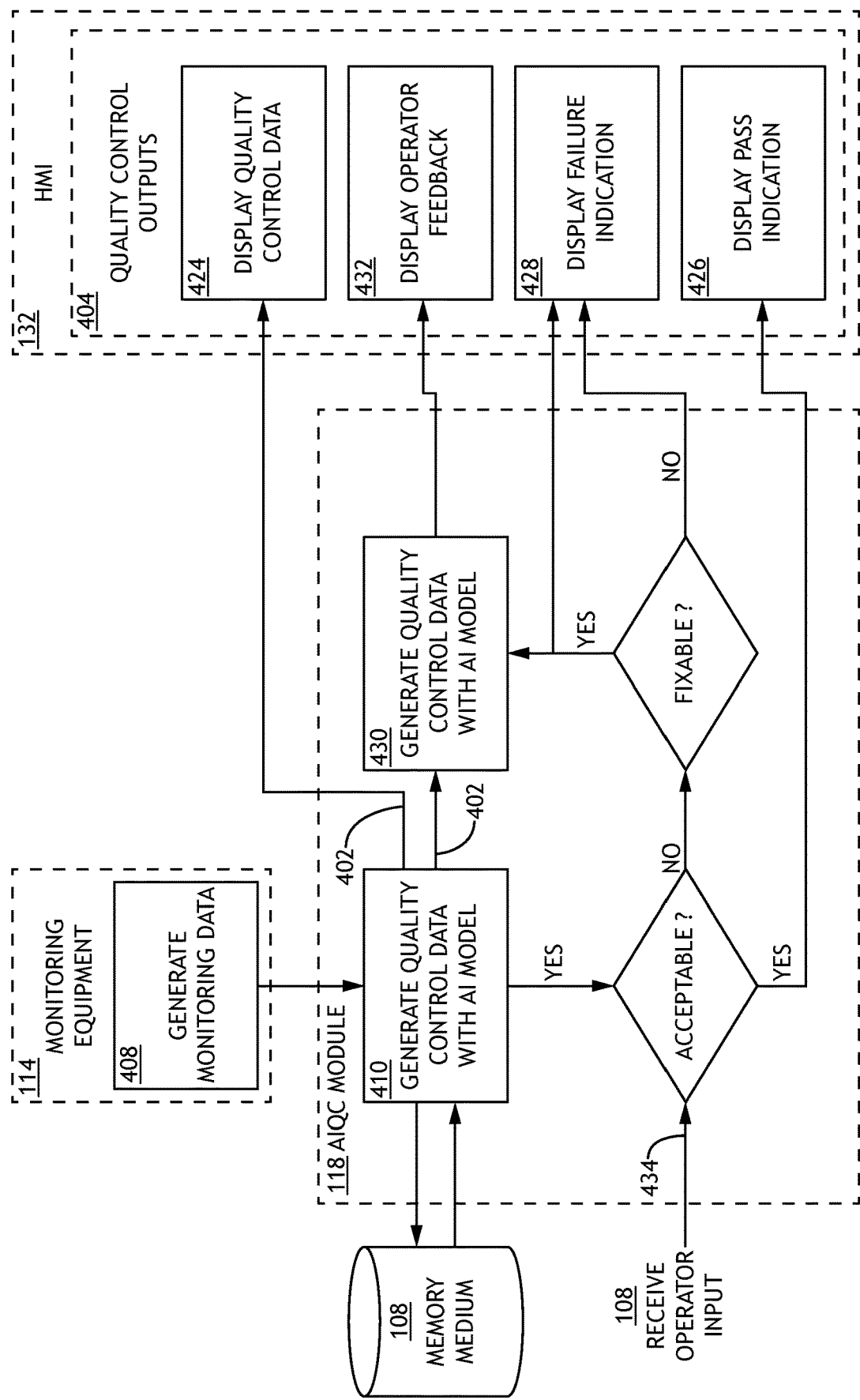
FIG. 4B is a flow diagram illustrating AI-guided quality control with an AIQC module, in accordance with one or more embodiments of the present disclosure.

Referring now to FIG. 4B, FIG. 4B is a flow diagram illustrating AI-guided quality control with an AIQC module 118, in accordance with one or more embodiments of the present disclosure.

In some embodiments, a monitoring equipment 114 generates monitoring data 116 (block 408) as an operator 110 performs an action associated with a process step. The monitoring data 116 may include data associated with any combination of the workpiece 120 and/or the operator 110. For example, the monitoring data 116 may include real-time data (e.g., images, spectral data, or the like) generated as the operator 110 performs the action. As another example, the monitoring data 116 may include data generated after the action or process step is completed (e.g., as an inspection step to assess whether the action or process step has been completed within desired tolerance).

In some embodiments, an AIQC module 118 implements an AI model such as, but not limited to, a machine learning model, to generate quality control data 402 associated with a quality of the workpiece 120 based on the monitoring data 116 (block 410).

The quality control data 402 may include any type of output data suitable for assessing a quality of a workpiece 120 and/or the actions of an operator 110 at a particular process step. In some embodiments, quality control data 402 includes high-level identification or classification data such as, but not limited to, numbers and/or classifications of detected foreign objects in a foreign object detection step, an indication of the presence of unwanted backing material in a ply backing inspection step, numbers or classifications of defects or nonconformities in a worked ply, or an indicator indicating that a workpiece has passed or failed quality control at a particular process step. In some embodiments, quality control data 402 includes portions of monitoring data 116 associated with a relevant quality issue such as, but not limited to, portions of images of detected foreign objects, unwanted ply backing material, or nonconformities in a worked ply. In some embodiments, quality control data 402 includes modified or processed versions of monitoring data 116 such as, but not limited to, markings or highlighting information added to portions of images of detected foreign objects, unwanted ply backing material, or nonconformities in a worked ply to assist in the analysis of the quality control data 402 by an operator 110.

An AI model implemented by an AIQC module 118 may utilize any suitable learning technique or combination of learning techniques. Further, an AI model implemented by an AIQC module 118 may utilize data from a variety of sources for training, training updates, or run-time operation. For example, an AI model associated with a particular process step may be trained using training data (e.g., located on the memory medium 108) including, but is not limited to, labeled or unlabeled monitoring data 116 associated with any process steps, testing data from the testing equipment 104, or training data from an external source (e.g., an image library, or the like). By way of another example, an AI model associated with a particular process step may receive monitoring data 116 during run-time associated with the particular process step and optionally any other process steps (e.g., previous process steps or subsequent process steps). Accordingly, an AI model may generally be trained prior to run-time and/or continually trained during run-time as additional monitoring data 116 and/or testing data is generated.

In some embodiments, the AI model utilizes a supervised learning technique. For example, the AI model may first be trained with a labeled training dataset that includes a set of input training and associated known or desired outputs. Through the process of training, the AI model generates a framework for predicting or generating the appropriate output from the given input data. After training, the AI model may receive unknown (e.g., unlabeled) input data and generate associated outputs. As an illustration in the context of foreign object detection, an AI model may be trained with a set of images of workpieces 120 (e.g., monitoring data 116 from the monitoring equipment 114) having known defects or no defects. The trained AI model may then identify defects in similar images of a workpiece 120. The AI model may further be trained to provide outputs with any desired level of granularity. In some cases, the AI model may merely determine whether or not a defect is present. In some cases, the AI model may identify locations of identified defects. In some cases, the AI model may classify the type of defect. In some cases, the AI model may provide a pass indicator or a fail indicator based on a predicted impact on the quality of a completed composite material 112 (e.g., as quantified by testing data 106 or any other suitable metric). Training and/or updating of an AI model may be suitable for, but is not limited to, training and/or updating based on the feedback arrows 406 in FIG. 4A as well as initial training and/or updating based on testing data 106.

In some embodiments, the AI model utilizes an unsupervised learning technique. For example, the AI model may receive unlabeled input data (e.g., unlabeled monitoring data 116) and may identify patterns or other structure in the data. Continuing the example of foreign object detection, an AI model incorporating unsupervised learning may analyze monitoring data 116 (e.g., images or the like) of workpieces 120 and may identify patterns or structures that may potentially be attributed to foreign objects. As another example, AI model incorporating unsupervised learning may analyze monitoring data 116 associated with multiple process steps to identify patterns or techniques that may tend to provide high-quality composite materials 112.

In some embodiments, the AI model utilizes a semi-supervised learning technique incorporating both labeled and unlabeled data. Continuing the example of foreign object detection, an AI model may be trained with some amount of labeled training data, but may also receive unlabeled data. The AI model may then identify patterns or other structures in the unlabeled data and potentially the labeled data as well. In this way, the labeled data may guide and improve the identification of patterns that may be attributed to foreign objects, but the foreign object detection may not be limited to the types of defects provided in the labeled training dataset.

[own] In some embodiments, the AI model utilizes reinforcement learning to generate and/or evaluate quality control data 402 based a quality control reward metric. For example, the AIQC module 118 may identify operator actions or properties of the workpiece 120 that provide high (or low) quality of the workpiece 120 and then provide feedback, recommendations, or guidance to the operator 110 intended to maximize the quality of the workpiece 120.

Using any combination of supervised learning, unsupervised learning, semi-supervised learning, reinforcement learning, or any other learning technique known in the art, an AIQC module 118 as disclosed herein may facilitate high-quality fabrication without specific or a priori knowledge of the exact conditions leading to high (or low) quality. Further, this approach may provide an assessment of the quality of a workpiece 120 that goes beyond traditional conceptions of defects or nonconformities (e.g., foreign objects, bridges, wrinkles, or the like) that takes into account any combination of measurable properties. As an illustration, an AI model implemented by an AIQC module 118 may identify patterns in monitoring data 116 that may be associated with high (or low) quality of the final composite material 112 (e.g., as indicated by the testing equipment 104. This may include patterns associated with the state of the workpiece 120 (e.g., patterns, structures, or aspects of images of the workpiece 120 at a given process step) as well as patterns associated with operator actions while implementing the given process step.

An AIQC module 118 may generally implement any type of AI model suitable for generating quality control data 402 associated with a particular process step based on at least the monitoring data 116 generated for the particular process step. For example, an AI model may include, but is not limited to, a deep learning technique (e.g., a neural network model such as an artificial neural network, a deep neural network, a convolutional neural network, a recurrent neural network, or the like), a support vector machine, a Bayesian network, a decision tree, or a regression analysis. In some embodiments, the AI model implements a neural network technique such as, but not limited to, a neural gas technique or a self-organizing map suitable for representing features or topological information from various input datasets (e.g., monitoring data 116, testing data 106, or the like).

In some embodiments, an AIQC module 118 implements a general transformer model to generate quality control data 402 based on monitoring data 116 from the monitoring equipment 114. A transformer model may generally be considered a variant of a neural network architecture that incorporates positional encodings of input information into the input data (e.g., as opposed to sequential processing of input data) and utilizes an attention mechanism to develop contextual relationships between various portions of the input data (e.g., self-attention) and/or contextual mappings between input and output data. These features advantageously facilitate efficient implementation through parallelization techniques and the use of large datasets during training and/or run-time. In particular, transformer-based models may outperform traditional neural network models such as convolutional neural networks commonly used in image analysis or recurrent neural networks commonly used in natural language processing (NLP) tasks along these metrics.

The transformer architecture may be broadly applied to a wide variety of data types. For example, existing transformer-based models for NLP applications include, but are not limited to, Bidirectional Encoder Representations from Transformers (BERT) or the GPT-3 model by OpenAI. As another example, existing transformer-based models for imaging applications include, but are not limited to, the DEtection TRansformer (DETR) for object identification or the Vision Transformer (ViT) for image classification.

It is contemplated herein that the transformer architecture may be well-suited for quality control during fabrication of a composite material 112. In particular, an AIQC module 118 implementing a transformer-based AI model at a particular process step may utilize an attention mechanism to develop nuanced contextual relationships between the quality of a workpiece 120 (either at the particular process step or at a testing stage as determined by the testing equipment 104) and monitoring data 116 from the particular process step or previous process steps. Further, the efficient operation of such a model may facilitate effective real-time analysis and feedback to an operator 110 at a timescale and level of complexity not possible with existing techniques.

In some embodiments, an automated layup table 102 includes one or more step-specific AIQC modules 118 implementing transformer-based AI models to generate quality control data 402 based on monitoring data 116 generated by the monitoring equipment 114. For example, an AIQC module 118 implementing a transformer-based AI model may be implemented for process steps such as, but not limited to, assessing a quality or age of the mold 124, laser templating for ply placement, foreign object detection, ply backing detection, or assessing a quality of a ply 122 worked into a mold 124.

Further, input data (e.g., monitoring data 116, testing data 106, or the like) may be provided to any selected type of AI model within an AIQC module 118 in any format. In some embodiments, input data for training and/or run-time operation is pre-processed prior to being provided to the AI model. For example, input data may be pre-processed to include contextual data such as, but not limited to, positional encodings, contextual information relating to the particular process step, contextual information relating to measurement parameters of the monitoring equipment 114, or an identity of an operator 110 performing the process step.

Figure 4C:
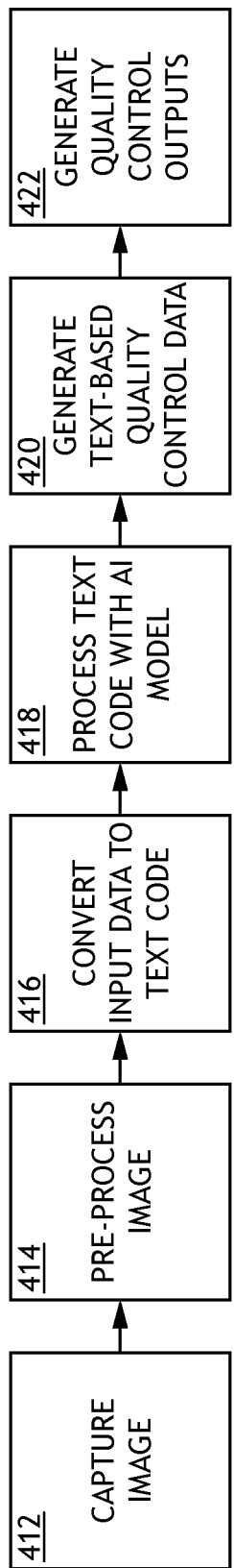
FIG. 4C is a flow diagram illustrating pre-processing of image data into text format and text-based AI analysis, in accordance with one or more embodiments of the present disclosure.

In some embodiments, input data is pre-processed into a text format prior to analysis with the AI model. In this way, AI models suitable for text-based inputs may be implemented by an AIQC module 118. FIG. 4C is a flow diagram illustrating pre-processing of image data into text format and text-based AI analysis, in accordance with one or more embodiments of the present disclosure. As an illustration, an image (e.g., associated monitoring data 116, testing data 106, or the like) may be captured as input data (block 412). In some applications, the image may further be pre-processed (block 414). For example, pre-processing may include various filtering or image processing steps to facilitate quality control analysis with the AI mode. The image may then be converted into a text code (block 416), which may include any type of information such as, but not limited to, pixel values (e.g., grayscale and/or color values), a location of the pixel in the image, and/or other contextual information. The text code may then be processed by an AI model (block 418), which may generate text-based quality control data 402 (block 420). Further, this approach allows the AI model to analyze all of the pixels in parallel. For example, the text-based quality control data 402 from the AI model may include a modified version of the text code input in which relevant quality issues are identified or modified. Various quality control outputs 404 may then be generated based on the quality control data 402 (block 422). For example, the text-based quality control data 402, or a portion thereof, may then be reconverted to an image format. In this way, the resulting output image may include an indication of the quality issues (e.g., highlighted foreign objects, unwanted ply backing material, bridges, wrinkles, or the like). It is to be understood that similar operations may be carried out for other types of input data such as, but not limited to, spectral data.

Referring generally to FIGS. 4A-4C, it is contemplated herein that an AI model associated with any of the AIQC modules 118 may be trained and/or updated either automatically or through a verification process. For example, prior to training and/or updating an AI model with additional data (e.g., monitoring data 116, quality control data 402 and/or quality control outputs 404 generated in response to the monitoring data 116, testing data 106 associated with pre-cure and/or post-cure test of an associated composite material 112) and any associated labels (e.g., whether the testing data 106 indicated that the composite material 112 passed a final inspection) may be verified by one or more additional users (e.g., one or more human users). In this way, the integrity of the AI model may be kept at a desired standard. As another example, an AI model may be automatically trained without verification. In some cases, an AI model is trained and/or updated using a hybrid approach. For example, training and/or updated may be subject to verification in a first phase but may become at least partially automated upon certain conditions such as, but not limited to, a threshold amount of data, a threshold timeframe, or successful verification of a threshold amount of data over a selected timeframe.

Referring again to FIG. 4B, in some embodiments, an AIQC module 118 may generate different quality control outputs 404 based on the quality control data 402 provided by the AI model. In some embodiments, the quality control outputs 404 are displayed on the operator interface 132 for communication to a human operator 110. In some embodiments, the quality control outputs 404 are provided to a machine operator as feedback.

The quality control outputs 404 may include any type of output suitable for communicating the results of the AI model and/or decisions generated based on the results of the AI model. For example, the quality control outputs 404 may include displays of portions of the quality control data 402 itself such as, but not limited to, high-level information, relevant portions of the monitoring data 116 (original or marked up) indicative of quality issues (block 424). By way of another example, the quality control outputs 404 may include information associated with the quality control data 402, but displayed in a different format than the associated monitoring data 116. As an illustration, locations of identified quality issues (foreign objects, unwanted ply backing, bridges, wrinkles, or the like) may be identified on the workpiece 120 using a laser scanner. By way of another example, the quality control outputs 404 may include a pass indication (block 426) indicating that quality tolerances for a particular process step are met and that the operator 110 may proceed to a subsequent step. By way of another example, the quality control outputs 404 may include a failure notification (block 428) indicating that quality tolerances for a particular process step are not met and that the associated quality issues are not fixable. In this case, the operator 110 may scrap the workpiece 120 without performing subsequent process steps.

By way of another example, the AIQC module 118 may generate operator feedback (block 430) and display this operator feedback (block 432) to the operator 110. As an illustration, if a quality issue is detected, but deemed to be fixable, the AIQC module 118 may generate and display various instructions for additional testing or how to fix the quality issue. These instructions may be in any format including, but not limited to, text, image, video, or hyperlinks to additional resources.

Referring still generally to FIG. 4B, it is contemplated herein that any of the associated steps may be performed in real time and/or after a process step has been completed. For example, real-time operator feedback may be generated based on real-time monitoring data 116 and analysis using the AI-model. It is contemplated herein that transformer-based AI models may be particularly beneficial for real-time feedback. However, real-time feedback is not limited to transformer-based AI architectures.

Further, although not explicitly illustrated in FIG. 4B, quality control outputs 404 may be generated and/or displayed prior to the operator 110 performing a process step. For example, the AI-guided composite fabrication system 100 may identify that quality issues in a particular process step have a relatively high impact on the final quality of the composite material (e.g., as determined by the testing equipment 104). In this case, the AI-guided composite fabrication system 100 may display quality control outputs 404 at the beginning of the process step such as, but not limited to, a warning to the operator 110 or additional instructions to the operator 110 to promote successful completion of the process step. By way of another example, the AI-guided composite fabrication system 100 may identify that the particular operator 110 has a history of inducing quality errors at a particular process step. In this case, the AI-guided composite fabrication system 100 may display user-specific quality control outputs 404 before or during the process step such as, but not limited to, a warning to the operator 110 or additional instructions to the operator 110 to promote successful completion of the process step.

Additionally, input from the operator 110 may be considered at any step. For example, FIG. 4B illustrates operator input (arrow 434). Input from the operator 110 may be used for any purpose including, but not limited to, reinforcement learning techniques. In some embodiments, an AIQC module 118 provides one or more quality control outputs 404 associated with the quality control data 402 to an operator 110 (e.g., a human operator) for verification. Any suitable quality control outputs 404 may be provided to the operator 110 (e.g., via an HMI operator interface 132) including, but not limited to, a pass indicator, a fail indicator, or portions of quality control data 402 deemed significant to the determination of whether a pass indicator or a fail indicator was provided. The operator 110 may then verify or override the quality control outputs 404 (e.g., using an HMI operator interface 132). In this way, the operator input may assist in the determination of whether an identified quality issue is acceptable. This input from the operator 110 may then be used to generate new quality control outputs 404 and/or be used to update or retrain an AI model (e.g., via feedback arrow 406 as illustrated in FIG. 4A). In some embodiments, a AI-guided composite fabrication system 100 requires, prior to completion of a particular process step, one of the pass indicator by the particular AI model and the verification by the operator 110 or the fail indicator by the particular AI model and the override by the operator 110. In this way, subsequent process steps may not be performed until one of these conditions are met.

Although not explicitly illustrated in FIG. 4B, in some embodiments, an automated layup table 102 may generate a quality control record including any combination of the inputs, outputs, or intermediate data associated with a particular workpiece 120 from any of the AIQC modules 118 across multiple processing steps. Such a quality control record may then be stored in any suitable location such as, but not limited to, the memory medium 108 or a remote server. It is contemplated herein that such a quality control record may be suitable for various purposes such as, but not limited to, investigation/review, verification, or AI model updating at any suitable time (e.g., not in real time).

Figure 5A:
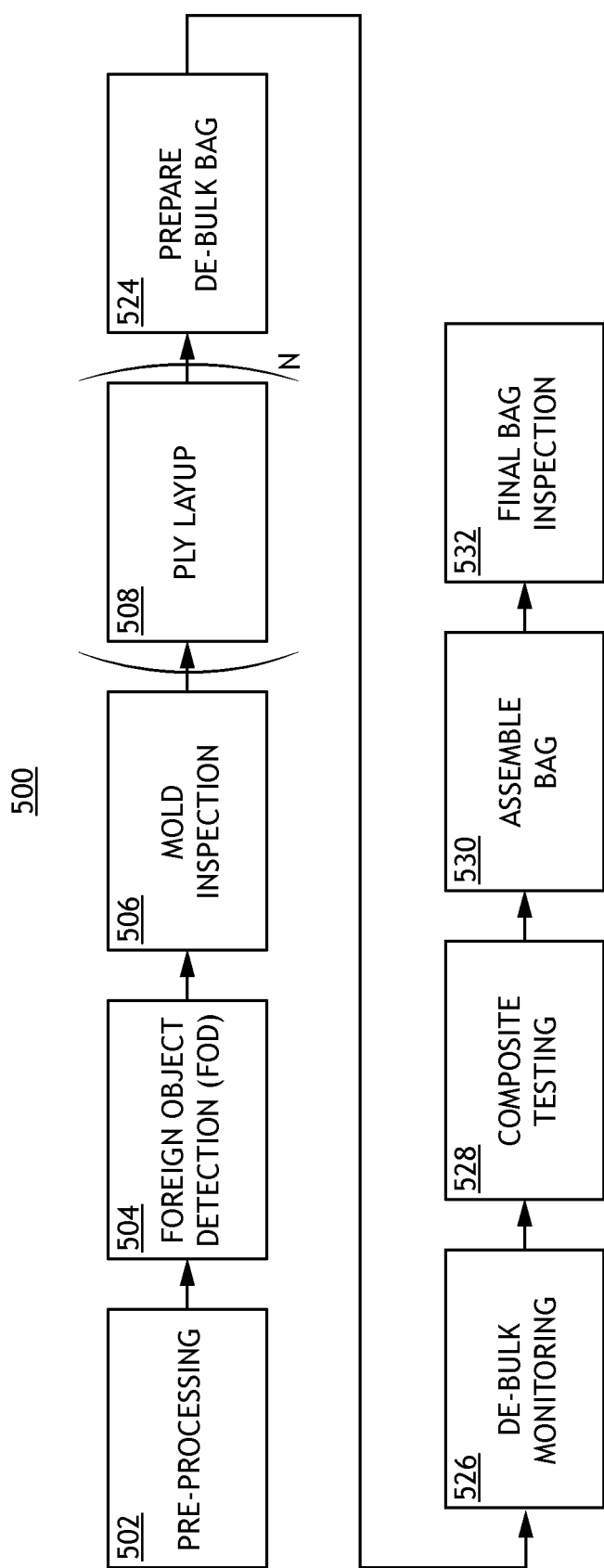
FIG. 5A is a flow diagram illustrating steps performed in a method for fabrication of a composite material with AI-guided quality control, in accordance with one or more embodiments of the present disclosure.
Figure 5B:
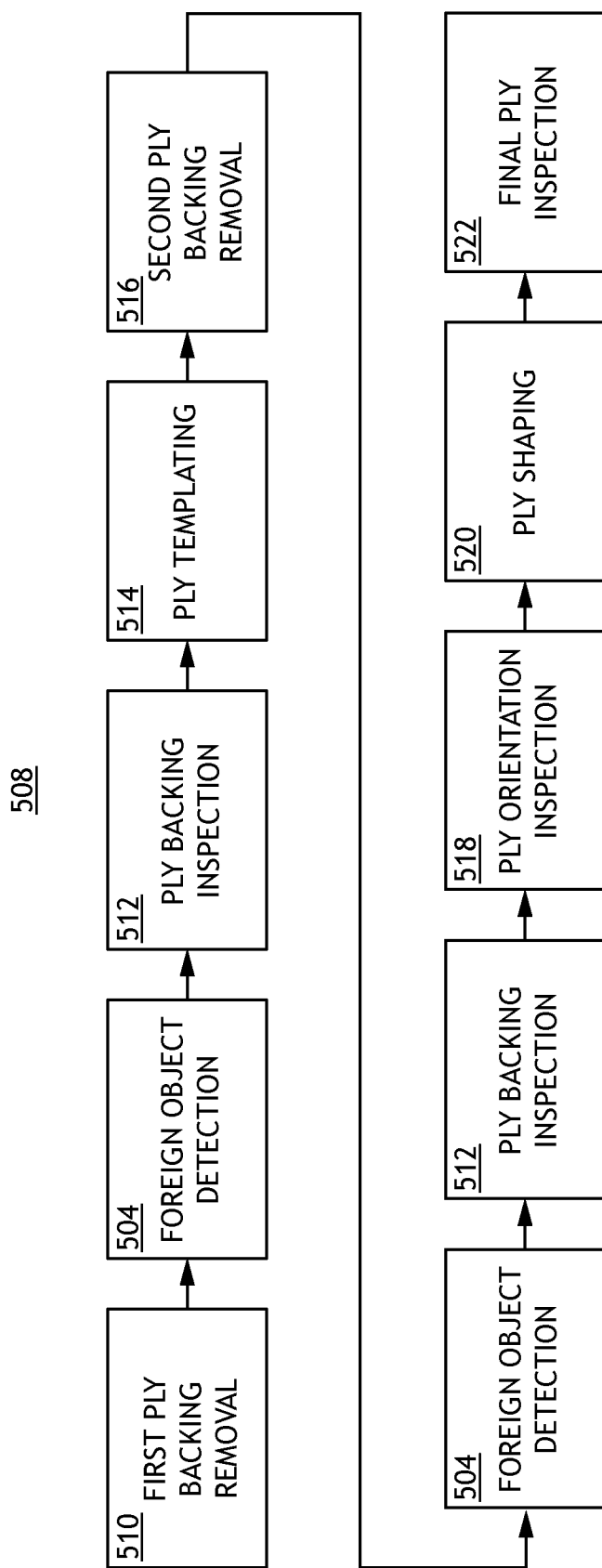
FIG. 5B is a flow diagram illustrating steps performed as part of a ply layup step, in accordance with one or more embodiments of the present disclosure.

Referring now to FIGS. 5-5B, the use of AI-guided quality control on specific process steps is described in greater detail.

FIG. 5A is a flow diagram illustrating steps performed in a method 500 for fabrication of a composite material 112 with AI-guided quality control, in accordance with one or more embodiments of the present disclosure. Applicant notes that the embodiments and enabling technologies described previously herein in the context of the AI-guided composite fabrication system 100 should be interpreted to extend to the method 500. It is further noted, however, that the method 500 is not limited to the architecture of the AI-guided composite fabrication system 100. Accordingly, references and examples to the AI-guided composite fabrication system 100 in the following description of the method 500 are provided solely for illustrative purposes and should not be interpreted as limiting. It is also to be understood that the specific process steps for the fabrication of a composite material 112 are provided solely for illustrative purposes and should not be interpreted as limiting of either the method 500 or the AI-guided composite fabrication system 100. Rather, AI-guided quality control may generally be implemented for any process step required for any type of fabrication process.

In some embodiments, the method 500 includes a pre-processing step 502. For example, the pre-processing step 502 may include various preparatory steps such as, but not limited to, retrieval of a workpiece 120 (e.g., one or more plies 122, a mold 124, or the like), preparation of the workpiece 120 (e.g., removing a release agent from the mold 124), moving an automated layup table 102 to a selected location, or providing power to the automated layup table 102.

In some embodiments, though not illustrated, the pre-processing step 502 includes a workpiece documentation step. For example, the workpiece documentation step may include acquiring and/or logging identifiers associated with the workpieces 120 or any constituent materials such as, but not limited to, the various plies 122 to be used to construct the composite material 112 or the mold 124 to be used to shape the automated layup tables 102. By way of another example, the workpiece documentation step may include associating such identifying information with a work order number or a workpiece label. Such identifying information may then be used to link monitoring data 116 associated with multiple process steps as well as testing data 106 to a particular workpiece 120.

In some embodiments, the method 500 includes a foreign object detection step 504 with AI-guided quality control. For example, the foreign object detection step 504 may detect the presence of foreign objects such as, but not limited to, dust, debris, or remnants of a mold release agent on the workpiece 120. AI-guided quality control of the foreign object detection step 504 may be implemented in any suitable manner including, but not limited to, with an automated layup table 102 including a monitoring data 116 coupled to an AIQC module 118 for this step.

In some embodiments, the AIQC module 118 associated with the foreign object detection step 504 identifies foreign objects on the workpiece 120 based on images of the workpiece 120 at one or more wavelengths (e.g., the monitoring data 116). For example, the monitoring equipment 114 may include an imaging detector 212 to generate one or more images of the workpiece 120 (e.g., as illustrated in FIG. 3A or 3B). As another example, the monitoring equipment 114 may include two spatially-separated imaging detectors 212 arranged to simultaneously image the workpiece 120 (e.g., as illustrated in FIG. 3C) in order to provide depth information for at least a portion of the workpiece 120. As another example, the monitoring equipment 114 may include a depth detector (e.g., a LIDAR detector, or the like), a proximity detector, or a surface profilometer to generate depth information. Further, the imaging detectors 212 may generate images of the workpiece 120 at any wavelength or combination of wavelengths. In this way, the monitoring equipment 114 may generate a hyperspectral image stack. For example, the monitoring illumination sources 216 may include, but are not limited to, a single laser source operating at a single wavelength to provide a narrowband image, multiple laser sources operating at multiple wavelengths (e.g., a red, green, and blue wavelengths, or the like) to generate a sequence of narrowband images at different wavelengths, or a broadband illumination source (e.g., a white-light source, or the like) coupled with spectral filters to generate a sequence of narrowband images. Further, the monitoring illumination sources 216 may fully illuminate a portion of the workpiece 120 during imaging or be coupled to scanning optics (e.g., 2D galvo mirrors, or the like) to scan the illumination across the workpiece 120 during capture to sequentially build up one or more images. As another example, the monitoring equipment 114 may include a spectrometer (e.g., a diffractive element and an imaging sensor) to directly measure an absorption and/or a reflection spectrum of the workpiece 120 (e.g., upon illumination with broadband light).

The AIQC module 118 associated with the foreign object detection step 504 may implement any suitable AI model such as, but not limited to, a transformer-based AI model or a neural gas model. For example, the AI model may include unsupervised, supervised, semi-supervised, and/or reinforcement learning based off of training data including a training dataset of images of workpieces 120 with known foreign objects generated by the monitoring equipment 114. The AI model may then distinguish between the workpiece 120 and foreign objects using any suitable technique or combination of techniques. For example, the AI model may utilize object detection and classification to identify the workpiece 120 within the images and label additional objects as foreign objects. As another example, the AI model may generate a 3D rendering of the workpieces 120 (e.g., using depth information provided by one or more detectors 212) and identify foreign objects based on deviations from that rendering).

The AIQC module 118 associated with the foreign object detection step 504 may then generate any suitable quality control data 402 and/or provide any suitable quality control outputs 404 to the operator 110. For example, the AIQC module 118 associated with the foreign object detection step 504 may provide portions of the image data modified to including markup information highlighting any identified defects (e.g., bounding boxes, or the like) using an operator interface 132. By way of another example, the AIQC module 118 may direct illumination steering components 220 to visually project indications of the foreign objects on the workpiece 120.

In some embodiments, the method 500 includes a mold inspection step 506 with AI-guided quality control. AI-guided quality control of the mold inspection step 506 may be implemented in any suitable manner including, but not limited to, with an automated layup table 102 including a monitoring data 116 coupled to an AIQC module 118 for this step.

The mold inspection step 506 may characterize various aspects of a mold 124 including, but not limited to the presence of a release agent, the type (e.g., composition) of the release agent, a thickness of the release agent (or thickness variations), or a surface quality of the mold 124 (e.g., a presence, characteristics, and/or distribution of cracks). It is contemplated herein that the mold inspection step 506 may be different than the foreign object detection step 504 since a uniform release agent on the workpiece 120 may generally have the same shape as the mold 124. Similarly, portions of the mold 124 that are degrading may not impact the shape of the mold 124. Accordingly, object identification or classification alone may not be sufficient. However, it may be the case that the same or similar monitoring equipment 114 may be used for a foreign object detection step 504 and a mold inspection step 506. In this case, different AI models may be trained on the different monitoring data 116 and/or labels associated with these steps.

It is contemplated herein that the presence of a release agent, a thickness of a release agent, and/or degradation due to mold aging or poor surface quality may be characterized by variations in the absorption and/or reflection spectrum of the workpiece 120 at one or more wavelengths. For example, the monitoring equipment 114 may include one or more detectors 212 (e.g., as illustrated in any of FIGS. 3A-3C) oriented to image the workpiece 120. In some cases, the monitoring equipment 114 includes two or more detectors 212 oriented at different angles such that the monitoring data 116 may include angularly-resolved data. As another example, the monitoring equipment 114 may include a spectrometer (e.g., a diffractive element and an imaging sensor) to directly measure an absorption and/or reflection spectrum of the workpiece 120 (e.g., upon illumination with broadband or narrowband light). In some embodiments, the AIQC module 118 associated with the mold inspection step 506 receives monitoring data 116 associated with depth or profile information from any suitable detector 212 (e.g., a LIDAR detector, a proximity detector, a surface profilometer, two or more cameras, or the like).

In some embodiments, the AIQC module 118 associated with the mold inspection step 506 receives monitoring data 116 (e.g., one or more images) from the monitoring equipment 114 associated with a set of molds 124 having one or more quality issues (e.g., with and without full or partial release agents and/or with and without molds with various surface quality and/or aging-related degradations) and then trains an AI model with training data including these images and the known quality issues (e.g., known values of the quality issues). The one or more images may include any type of images such as, but not limited to, one or more broadband images or one or more narrowband images, or hyperspectral data (e.g., a series of images associated with different wavelengths).

The AIQC module 118 associated with the mold inspection step 506 may implement any suitable AI model such as, but not limited to, a transformer-based AI model or a neural gas model. For example, the AI model may include unsupervised, supervised, semi-supervised, and/or reinforcement learning based off of the training data including a training dataset of images of workpieces 120 generated by the monitoring equipment 114 with and without full or partial release agents and/or with and without molds with various aging degradations.

During run-time, the AIQC module 118 may then receive monitoring data 116 (e.g., one or more images) from the monitoring equipment 114 associated with a mold 124 (e.g., a run-time mold 124). and generate quality control data 402 indicative of a quality of the run-time mold 124 (e.g., related to the presence of a release agent, the type (e.g., composition) of the release agent, a thickness of the release agent (or thickness variations), a surface quality of the mold 124, aging-related degradation of the mold 124, or the like).

The AIQC module 118 associated with the mold inspection step 506 may then generate any suitable quality control data 402 and/or provide any suitable quality control outputs 404 to the operator 110. For example, the AIQC module 118 associated with the mold inspection step 506 may provide portions of the image data modified to including markup information highlighting any identified regions with quality issues. By way of another example, the AIQC module 118 may direct the illumination steering components 220 to visually project indications of the locations of the quality issues on the workpiece 120.

In some embodiments, the method 500 includes one or more ply layup steps 508 in which plies 122 are sequentially worked into a mold 124, which is illustrated in FIG. 5A as N iterations of a ply layup step 508. It is contemplated herein that a particular ply layup step 508 may itself involve multiple process steps that may benefit from AI-guided quality control. FIG. 5B is a flow diagram illustrating steps (or substeps) performed as part of a ply layup step 508, in accordance with one or more embodiments of the present disclosure.

In some embodiments, a ply layup step 508 includes a first ply backing removal step 510. A ply 122 may be stored with backing material as protective layers on one or both sides. Accordingly, the first ply backing removal step 510 may include removal of a first backing layer such as, but not limited to, a "down" backing layer associated with a side of the ply 122 that will be in contact with the mold 124 or previous plies 122.

A ply layup step 508 may then include one or more ply inspection steps following the first ply backing removal step 510. In some embodiments, a ply inspection step includes a foreign object detection step 504. It is contemplated herein that this may be substantially similar to the foreign object detection step 504 implemented on the mold 124 prior to the layup of any automated layup tables 102. However, the training data may be, but is not required to be tailored for the detection of foreign objects on plies 122 or a particular ply 122. In this way, the AIQC module 118 may provide tailored quality control data 402 and associated quality control outputs 404 to the operator 110 (which may or may not be the same operator 110 as for the previous foreign object detection step 504).

In some embodiments, a ply inspection step includes a ply backing inspection step 512 with AI-guided quality control. For example, a ply backing inspection step 512 may determine whether a backing material is present on the ply 122. AI-guided quality control of ply backing inspection step 512 may be implemented in any suitable manner including, but not limited to, with an automated layup table 102 including a monitoring data 116 coupled to an AIQC module 118 for this step.

In some embodiments, the AIQC module 118 associated with the ply backing inspection step 512 identifies the presence of backing material based on one or more images of the workpiece 120 including the ply 122 with the monitoring equipment 114. It is contemplated herein that the presence of ply backing material may be a relatively easier quality control problem than other steps due to features of the ply backing such as, but not limited to, the absorption properties, color, or the presence of patterns on the material. For example, the monitoring equipment 114 may include a single imaging detector 212 and any suitable workspace illumination source 208 (e.g., a white-light source, or the like).

The AIQC module 118 associated with the ply backing inspection step 512 may implement any suitable AI model such as, but not limited to, a transformer-based AI model or a neural gas model. For example, the AI model may include unsupervised, supervised, semi-supervised, and/or reinforcement learning based off of training data including a training dataset of images of workpieces 120 without backing material and backing material. Further, the AI model may be trained with any number of backing materials that may be encountered to provide flexible operation on a range of materials. The AI model may then identify the presence of a backing layer based on the mold 124 based on the images generated during run-time.

The AIQC module 118 associated with the ply backing inspection step 512 may then generate any suitable quality control data 402 and/or provide any suitable quality control outputs 404 to the operator 110. For example, the AIQC module 118 associated with the ply backing inspection step 512 may provide portions of the image data modified to including markup information highlighting any identified regions with quality issues. By way of another example, the AIQC module 118 may direct a laser scanner to visually project indications of the locations of the quality issues on the workpiece 120. By way of another example, the AIQC module 118 may provide a pass or fail indication to the operator 110 to indicate whether or not the operator 110 may proceed to the next step.

In another embodiment, a ply layup step 508 includes a ply templating step 514 for ply placement with AI-guided quality control. For example, the ply templating step 514 may utilize an AI-based object detection technique to identify an orientation of the workpiece 120 based on images from the monitoring equipment 114 and project a continually-updating placement pattern on the workpiece 120 based on a continual assessment of the orientation of the workpiece 120. AI-guided quality control of the ply templating step 514 may be implemented in any suitable manner including, but not limited to, with an automated layup table 102 including a monitoring data 116 coupled to an AIQC module 118 for this step.

In some embodiments, the AIQC module 118 associated with the ply templating step 514 may perform 2D object orientation detection based on images from a single detector 212 of the monitoring equipment 114. In some embodiments, the AIQC module 118 associated with the ply templating step 514 may perform 3D object orientation detection based on images and depth information from the monitoring equipment 114. The depth information may be provided using any suitable technique such as, but not limited to, two spatially-separated detectors 212 as illustrated in FIG. 3C, a single detector 212 with a depth sensor (e.g., LIDAR sensor, or the like), or any other suitable technique or combinations of techniques.

Various types of illumination may be suitable for the generation of the monitoring data 116. For example, the workpiece 120 may be illuminated with broadband and/or narrowband illumination (e.g., generated by a monitoring illumination source 216 and/or room lights). As another example, the workpiece 120 may be, but is not required to be, back illuminated, which may increase contrast between the workpiece 120 and a platform 204 on which the workpiece 120 is secured or placed. As an illustration, the platform 204 may be formed from an at least partially transparent material such that a monitoring illumination source 216 may illuminate the workpiece 120 through the platform 204.

In some embodiments, the AIQC module 118 associated with the ply templating step 514 may utilize an AI model to identify tracking points on any combination of the workpiece 120, a ply 122 located on the workpiece 120 for layup, a mold 124, or a platform 204. For example, tracking points may include identifiable locations on any of the corresponding objects that may be detected in monitoring data 116 (e.g., images). In this way, the relative locations and/or orientations of the workpiece 120, the ply 122, and/or the platform 204 may be independently tracked based on the tracking points.

In some embodiments, the platform 204 and/or the monitoring equipment support structures 210 are rotatable. In this way, monitoring data 116 may be generated at different relative orientations of the workpiece 120, which may facilitate the identification of the workpiece 120 and the generation of separate tracking points for the workpiece 120 and the platform 204.

The AIQC module 118 associated with the ply templating step 514 may implement any suitable AI model such as, but not limited to, a transformer-based AI model or a neural gas model. For example, the AI model may include unsupervised, supervised, semi-supervised, and/or reinforcement learning based off of training data including a training dataset of images of workpieces 120. The AI model may then identify the presence and orientation of the workpiece 120, a ply 122, and/or the platform 204 based on the images generated during run-time.

In some embodiments, an AIQC module 118 associated with the ply templating step 514 implements AI-guided ply templating. For example, the AIQC module 118 may receive a map of a workpiece 120 and a desired placement position of a ply 122 on the workpiece 120. The map may include any type of data suitable for indicating a desired placement of the ply 122 on the workpiece 120 including, but not limited to, three-dimensional data of the ply 122 and/or the workpiece 120 (e.g., a computer-aided drafting (CAD) file or other three-dimensional data) or two-dimensional data of the ply 122 and/or the workpiece 120 (e.g., a flattened rendering of the ply 122 and/or the workpiece 120 that may replicate associated monitoring data 116). The AIQC module 118 may also receive image data (e.g., monitoring data 116 including one or more images) from the monitoring assembly associated with the workpiece 120. The AIQC module 118 may also implement one or more AI models to identify the workpiece 120 in the image data and further identify the desired placement position of the ply 122 on the workpiece 120. The AIQC module 118 may also identify the platform 204 (e.g., as distinct from the workpiece 120 and the ply 122). The AIQC module 118 may also direct one or more optical elements (e.g., the illumination steering components 220) to project a placement pattern on the workpiece at the desired placement position (e.g., based on the positions of the workpiece 120, the ply 122, and/or the platform 204). The AIQC module 118 may also detect movements of the workpiece in the image data. For example, the AIQC module 118 may track the positions of the workpiece 120, the ply 122, and/or the platform 204 based on tracking points associated with any combination of these. The AIQC module 118 may also direct the one or more optical elements to update the placement pattern on the workpiece 120 based on the movements of the workpiece 120.

The AIQC module 118 associated with the ply templating step 514 may then generate any suitable quality control data 402 and/or provide any suitable quality control outputs 404 to the operator 110. For example, the AIQC module 118 associated with the ply templating step 514 may provide the continuously-updating placement pattern as quality control data 402.

It is contemplated herein that an AI-guided ply templating step 514 may be more robust than alternative techniques of laser templating based on alignment marks on the workpiece or a workspace, particularly when coupled with a dedicated templating device 126 for a particular automated layup table 102. For example, the use of AI-based object recognition and orientation detection may be more accurate to shifts, bumps, vibrations, or movements (e.g., angular position changes) than techniques based on alignment marks. Further, a transformer-based structure may be particularly beneficial for efficient real-time processing, but is not a requirement.

In some embodiments, a ply layup step 508 includes a second ply backing removal step 516 in which a second backing layer is removed from the ply 122 (e.g., an "up" layer to be oriented on a face opposite the mold 124). A ply layup step 508 may then include one or more ply inspection steps following the second ply backing removal step 516 such as, but not limited to, a foreign object detection step 504 or a ply backing inspection step 512.

In some embodiments, a ply layup step 508 includes a ply orientation inspection step 518 with AI-guided quality control. For example, the ply orientation inspection step 518 may determine the orientation of the ply 122 with respect to the mold 124 and/or the projected placement pattern from the ply templating step 514 using AI-guided object detection. In particular, the ply orientation inspection step 518 may include detection and/or classification of various imaged objects including the ply 122, patterns on the ply 122 (e.g., weave patterns, or the like), the mold 124, and/or a projected placement pattern (e.g., by the templating device 126). The relative positions and/or orientations of these detected objects may then be used to provide quality control data 402 and quality control outputs 404 to the operator 110 to facilitate ply placement.

The ply orientation inspection step 518 step may operate on any suitable monitoring data 116 from the monitoring equipment 114. For example, the ply orientation inspection step 518 step may provide 2D or 3D object detection and position detection in a manner substantially similar to the ply templating step 514.

The AIQC module 118 associated with the ply orientation inspection step 518 may implement any suitable AI model such as, but not limited to, a transformer-based AI model or a neural gas model. For example, the AI model may include unsupervised, supervised, semi-supervised, and/or reinforcement learning based off of training data including a training dataset of images of workpieces 120. The AI model may then identify the presence and orientation of the ply 122, the mold 124, and/or the projected placement pattern based on the images generated during run-time.

The AIQC module 118 associated with the ply orientation inspection step 518 may then generate any suitable quality control data 402 and/or provide any suitable quality control outputs 404 to the operator 110. For example, the AIQC module 118 associated with the ply orientation inspection step 518 may provide a pass or fail indication of whether or not the ply 122 is properly placed. As another example, the AIQC module 118 associated with the ply orientation inspection step 518 may provide an image of the workpiece 120 with visual indicators of how to adjust the automated layup table 102 (e.g., via arrows or other markings).

In some embodiments, a ply layup step 508 includes a ply conformance step 520 in which the operator 110 conforms the automated layup table 102 to the mold 124.

In some embodiments, a ply layup step 508 includes a ply conformance inspection step 522, which may be performed in parallel with and/or after the ply conformance step 520.

The ply conformance inspection step 522 may assess various aspects of the workpiece 120 and/or the actions of the operator 110 during or after the ply conformance step 520 such as, but not limited to, whether the ply 122 is properly positioned on the mold 124 or whether various nonconformities such as, but not limited to, wrinkles or bridges are present.

The AIQC module 118 associated with the ply conformance inspection step 522 may operate on any data generated by any combination of monitoring equipment 114. For example, the AIQC module 118 associated with the ply conformance inspection step 522 may operate on monitoring data 116 such as, but not limited to, images from one or more detectors 212 providing 2D or 3D information, spectroscopic data, or thermal images from a thermal detector 212. As an illustration, the monitoring equipment 114 may include a thermal monitoring illumination source 216 and a thermal detector 212 for generating flash thermography data (e.g., as monitoring data 116) for analysis by the AIQC module 118.

The AIQC module 118 associated with the ply conformance inspection step 522 may implement any suitable AI model or combination of models such as, but not limited to, transformer-based AI models or neural-gas models. For example, the AI model may include unsupervised, supervised, semi-supervised, and/or reinforcement learning based off of training data including a training dataset of monitoring data 116 associated with workpieces 120 with varying combinations of known quality issues (e.g., improper ply placement, improper thickness, UVCs, or the like). The AIQC module 118 associated with the ply conformance inspection step 522 may then implement any combination of AI-based techniques to assess the quality of the workpiece 120. In this way, the ply conformance inspection step 522 may operate in a manner substantially similar to the foreign object detection step 504, the mold inspection step 506, the ply templating step 514, the ply orientation inspection step 518, or a combination thereof.

It is further contemplated herein that the ply conformance step 520 may be particularly vulnerable to operator-based quality issues. For example, as described previously herein, different operators 110 may tend to have repetitive movements or techniques that may be more or less likely to induce quality issues. Accordingly, the ply conformance inspection step 522 may perform AI-guided quality control analysis of various actions of the operator 110 during the ply conformance step 520 based on monitoring data 116 associated with the operator 110 such as, but not limited to, images or video of the operator 110 during the operation of the ply conformance step 520.

The AIQC module 118 associated with the ply conformance inspection step 522 may then generate any suitable quality control data 402 and/or provide any suitable quality control outputs 404 to the operator 110. For example, the AIQC module 118 associated with the ply conformance inspection step 522 may provide a pass or fail indication of whether or not the ply 122 is properly shaped. As another example, the AIQC module 118 associated with the ply conformance inspection step 522 may provide indicators to the operator 110 of any detected quality issues such as, but not limited to, marked-up images on or laser-projected patterns of the workpiece 120 indicating the locations and/or type of quality issues. As another example, the AIQC module 118 associated with the ply conformance inspection step 522 may provide operator specific guidance at any time throughout the ply conformance step 520.

In some embodiments, a ply layup step 508 includes one or more additional inspection steps as part of a final inspection prior to layup of another ply 122. For example, a ply layup step 508 may include another foreign object detection step 504. By way of another example, a ply layup step 508 may include a thickness measurement step. For instance, a thickness measurement may reveal whether the proper number of plies 122 have been laid up.

Referring again to FIG. 5A, in some embodiments, the method 500 includes a de-bulk bag preparation step 524 in which the operator 110 places the workpiece 120 in a de-bulk bag and initiates a de-bulking process. For example, the operator 110 may attach the de-bulk bag to a vacuum assembly for de-pressurizing the workpiece 120.

In some embodiments, the method 500 includes a de-bulk bag monitoring step 526 with AI-guided quality control. The de-bulk bag monitoring step 526 may assess various aspects of de-bulking process and ensure that a desired de-bulking procedure is followed. For example, a de-bulking procedure may require a vacuum to be maintained at a selected pressure (or threshold) for a selected time. Accordingly, the de-bulk bag monitoring step 526 may utilize various AI-based techniques to detect leaks and further to assess the impact of the leaks on the quality of the workpiece 120.

The AIQC module 118 associated with the de-bulk bag monitoring step 526 may operate on any data generated by any combination of monitoring equipment 114. For example, the AIQC module 118 associated with the de-bulk bag monitoring step 526 may operate on monitoring data 116 such as, but not limited to, time-sampled vacuum data, images from one or more detectors 212 providing 2D or 3D information of the workpiece 120 in the de-bulk bag, or thermal images of the workpiece 120 in the de-bulk bag (e.g., thermal images indicative of air leaking from the de-bulk bag, flash thermography data, or the like).

The AIQC module 118 associated with the de-bulk bag monitoring step 526 may implement any suitable AI model or combination of models such as, but not limited to, transformer-based AI models or neural gas models. For example, the AI model may include unsupervised, supervised, semi-supervised, and/or reinforcement learning based off of training data including a training dataset of monitoring data 116 associated with various leaks and associated quality impacts (e.g., as determined by testing equipment 104).

The AIQC module 118 associated with the de-bulk bag monitoring step 526 may then generate any suitable quality control data 402 and/or provide any suitable quality control outputs 404 to the operator 110. For example, the AIQC module 118 associated with the de-bulk bag monitoring step 526 may provide a pass or fail indication of whether or a de-bulk process was properly implemented. As another example, the AIQC module 118 associated with the de-bulk bag monitoring step 526 may provide alerts or other indicators when a leak is detected. As another example, the AIQC module 118 associated with the de-bulk bag monitoring step 526 may provide indicators of a location and/or strength of the leak. As another example, the AIQC module 118 associated with the de-bulk bag monitoring step 526 may provide instructions to the operator 110 on how to address an identified leak.

In some embodiments, the method 500 includes a composite testing step 528 to generate testing data 106 associated. For example, the composite testing step 528 may be implemented by the AI-guided composite fabrication system 100 and may include any type of quality control or reliability testing such as, but not limited to ultrasonic testing (e.g., A-scans or C-scans). As described previously herein, data collected in this composite testing step 528 may be used to train or update any AIQC modules 118 for any step.

In some embodiments, the method 500 includes a final bag assembly step 530 in which the workpiece 120 is placed in a final bag and an additional de-bulk bag monitoring step 526.

Referring again generally to FIGS. 5A and 5B, it is to be understood that the particular steps associated with the fabrication of a composite material 112 as well as the specific configurations of any of the AI-guided quality control steps are provided solely for illustrative purposes and should not be interpreted as limiting. In a general sense, the systems and methods disclosed herein may be extended to or adapted to any suitable fabrication process.

Referring now generally to FIGS. 5A-5B, additional aspects of the AI-guided composite fabrication system 100 are described in greater detail, in accordance with one or more embodiments of the present disclosure.

In some embodiments, the AI-guided composite fabrication system 100 modifies (e.g., adjusts and/or updates) one or more process steps for fabricating a composite material 112 based on AI-guided quality control. As described previously herein, it may be the case that some weaknesses in a composite material 112 may be formed by a combination of characteristics associated with multiple process steps (e.g., compound issues). As an illustration, a surface crack on a mold 124 combined with a wrinkle, bridge, or foreign object at the same location may lower a quality of the completed composite material 112. In addition to generating quality control data 402 and/or quality control outputs 404 at the relevant process steps, the AI-guided composite fabrication system 100 may further adjust and/or update the relevant process steps based on this quality control data 402 and/or quality control outputs 404. Continuing the illustration, the AI-guided composite fabrication system 100 may, upon detecting the presence of a surface defect on a mold 124 at a particular location in a mold inspection step 506, adjust and/or update the process steps associated foreign object detection step 504 and/or ply conformance step 520 to avoid the compound issues of foreign objects, wrinkles, or bridges at this particular location.

Adjustments and/or updates to the associated process steps may be made using a variety of techniques. In some embodiments, adjustments and/or updates are made to a set of instructions given to an operator 110 at a particular process step (e.g., a recipe to be followed to implement the process step). In some embodiments, adjustments and/or updates are made by providing additional operator feedback (e.g., block 432 in FIG. 4B) before, during, or after the operator performs one or more process steps. Regardless of the technique, the operator 110 may be aware of a potential issue and may take actions to avoid such compound issues.

Similarly, as described previously herein, it may be the case that one or more AIQC modules 118 may identify certain patterns in the monitoring data 116 associated with one or more process steps (e.g., based on a state of the workpiece 120, actions of the operator 110, or the like) and the associated testing data 106 that statistically lead to higher quality composite materials 112 as characterized by the testing data 106. In this case, the AI-guided composite fabrication system 100 may modify (e.g., adjust and/or update) any of the process steps to promote the implementation of the process steps in a way that provides these patterns and thus provides high quality composite materials 112.

In some embodiments, the AI-guided composite fabrication system 100 selects and/or updates the monitoring data 116 generated by the monitoring equipment 114 for any of the process steps based on relationships between the monitoring data 116, the quality control data 402, the quality control outputs 404, and/or operator input (e.g., block 434 in FIG. 4B). In this way, monitoring data 116 sensitive to quality control issues at any particular process step may be generated and utilized for AI-guided quality control. For example, it may be the case that images based on certain wavelengths or wavelength ranges may be relatively sensitive to quality control issues at a particular process step, whereas images based on other wavelengths or wavelength ranges may be relatively insensitive to such quality control issues. Accordingly, an AIQC module 118 for the particular process step (or the AI-guided composite fabrication system 100 more generally) may identify such patterns. The AIQC module 118 (or the AI-guided composite fabrication system 100 more generally) may then either automatically adjust the generated monitoring data 116 for future workpieces 120 or provide the patterns to a user (e.g., via the operator interface 132, a generated file stored in the memory medium 108, or any other suitable technique) for verification prior to any adjustments.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A ply templating system comprising:
   one or more optical elements configured to project one or more placement patterns onto a workpiece;
   a monitoring assembly including one or more detectors; and
   a controller communicatively coupled with the monitoring assembly, the controller including one or more processors configured to execute program instructions causing the one or more processors to:
   receive a map of a workpiece and a desired placement position of a ply on the workpiece;
   receive image data from the monitoring assembly associated with the workpiece;
   implement one or more artificial intelligence (AI) models to identify the workpiece in the image data and further identify the desired placement position of the ply on the workpiece;
   analyze the image data with the one or more AI models to generate one or more tracking points on the workpiece based on the image data;
   track a location of the one or more tracking points on the workpiece,
   wherein a relative location or orientation of the workpiece is independently tracked based on the one or more tracking points;
   direct the one or more optical elements to project a placement pattern on the workpiece at the desired placement position;
   detect movements of the workpiece in the image data; and
   direct the one or more optical elements to update the placement pattern on the workpiece based on the movements of the workpiece.

2. The ply templating system of claim 1, wherein the one or more optical elements comprise:
   an optical projector.

3. The ply templating system of claim 1, wherein the one or more optical elements comprise:
   a scanner.

4. The ply templating system of claim 3, wherein the monitoring assembly includes an imaging detector to generate the two-dimensional image data.

5. The ply templating system of claim 1, further comprising a platform for securing the workpiece, wherein implementing the one or more AI models to identify the workpiece in the image data and further identify the desired placement position of the ply on the workpiece further comprises:

analyze the image data with the one or more AI models to generate one or more tracking points on a platform securing the workpiece based on the image data;
tracking locations of the one or more additional tracking points; and
identifying movements of the workpiece relative to the platform.

6. The ply templating system of claim 5, wherein the platform is at least partially transparent, wherein the ply templating system further comprises:
an illumination source to illuminate the workpiece through the at least partially transparent platform.

7. The ply templating system of claim 5, wherein at least a portion of the platform is rotatable.

8. The ply templating system of claim 1, wherein the image data comprises:
two-dimensional image data.

9. The ply templating system of claim 3, wherein the AI model identifies the workpiece in the image data and the desired placement position of the ply using two-dimensional object detection.

10. The ply templating system of claim 1, wherein the image data comprises:
three-dimensional image data.

11. The ply templating system of claim 10, wherein the monitoring assembly includes two spatially-separated imaging detectors to generate the three-dimensional image data.

12. The ply templating system of claim 10, wherein the AI model identifies the workpiece in the image data and the desired placement position of the ply using three-dimensional object detection.

13. The ply templating system of claim 10, wherein the monitoring assembly includes one or more depth sensors to generate the three-dimensional image data.

14. The ply templating system of claim 1, wherein an orientation of the workpiece is known prior to generating the image data.

15. The ply templating system of claim 1, wherein an orientation of the workpiece is unknown prior to generating the image data, wherein the AI model further determines the orientation of the workpiece.

16. A system comprising:
a hardware controller communicatively coupled with a monitoring assembly including one or more detectors and to one or more optical elements configured to project one or more placement patterns onto a workpiece, the controller including one or more processors configured to execute program instructions causing the one or more processors to:
receive a map of a workpiece and a desired placement position of a ply on the workpiece;
receive image data from the monitoring assembly associated with the workpiece;
implement one or more artificial intelligence (AI) models to identify the workpiece in the image data and further identify the desired placement position of the ply on the workpiece;
analyze the image data with the one or more AI models to generate one or more tracking points on the workpiece based on the image data;
track a location of the one or more tracking points on the workpiece,
wherein a relative location or orientation of the workpiece is independently tracked based on the one or more tracking points;
direct the one or more optical elements to project a placement pattern on the workpiece at the desired placement position;
detect movements of the workpiece in the image data; and
direct the one or more optical elements to update the placement pattern on the workpiece based on the movements of the workpiece.

17. A ply templating method comprising:
receiving a map of a workpiece and a desired placement position of a ply on a workpiece;
receiving image data associated with the workpiece from a monitoring assembly including one or more detectors;
implementing one or more artificial intelligence (AI) models to identify the workpiece in the image data and further identify the desired placement position of the ply on the workpiece;
analyze the image data with the one or more AI models to generate one or more tracking points on the workpiece based on the image data;
tracking locations of the one or more tracking points on the workpiece,
wherein a relative location or orientation of the workpiece is independently tracked based on the one or more tracking points;
directing a scanner to project a placement pattern on the workpiece at the desired placement position;
detecting movements of the workpiece in the image data; and
directing the scanner to update the placement pattern on the workpiece based on the movements of the workpiece.

18. The method of claim 17, wherein the monitoring assembly further comprises one or more optical elements including an optical projector.

19. The method of claim 18, wherein the one or more optical elements comprise:
the scanner.

20. The method of claim 17, wherein implementing the one or more AI models to identify the workpiece in the image data and further identify the desired placement position of the ply on the workpiece further comprises:
analyze the image data with the one or more AI models to generate one or more tracking points on a platform securing the workpiece based on the image data;
tracking locations of the one or more additional tracking points; and
identifying movements of the workpiece relative to the platform.

21. The method of claim 20, wherein the platform is at least partially transparent, wherein a ply templating system associated with the platform comprises:
an illumination source to illuminate the workpiece through the at least partially transparent platform.

22. The method of claim 20, wherein at least a portion of the platform is rotatable.

23. The method of claim 17, wherein the image data comprises:
two-dimensional image data.

24. The method of claim 17, wherein the monitoring assembly includes an imaging detector to generate the two-dimensional image data.

25. The method of claim 24, wherein the AI model identifies the workpiece in the image data and the desired placement position of the ply using two-dimensional object detection.

26. The method of claim 17, wherein the image data comprises:
three-dimensional image data.

27. The method of claim 26, wherein the monitoring assembly includes two spatially-separated imaging detectors to generate the three-dimensional image data.

28. The method of claim 26, wherein the AI model identifies the workpiece in the image data and the desired placement position of the ply using three-dimensional object detection.

29. The method of claim 26, wherein the monitoring assembly includes one or more depth sensors to generate the three-dimensional image data.

30. The method of claim 17, wherein an orientation of the workpiece is known prior to generating the image data.

31. The method of claim 17, wherein an orientation of the workpiece is unknown prior to generating the image data, wherein the method further determines the orientation of the workpiece.

\* \* \* \* \*